(12) United States Patent
Riedel et al.

(10) Patent No.: US 11,306,775 B2
(45) Date of Patent: Apr. 19, 2022

(54) LOAD SENSING BEARING WITH INTEGRATED SENSOR MODULE

(71) Applicant: Regal Beloit America, Inc., Beloit, WI (US)

(72) Inventors: Carl Riedel, Chesterton, IN (US); Scott Phillips, Valparaiso, IN (US); Kim Hoffmann, Chesterton, IN (US); Matthew Campbell, Valparaiso, IN (US); Michael Peschke, Whiting, IN (US)

(73) Assignee: REGAL BELOIT AMERICA, INC., Beloit, WI (US)

( * ) Notice: Subject to any disclaimer, the term of this patent is extended or adjusted under 35 U.S.C. 154(b) by 0 days.

(21) Appl. No.: 16/986,050

(22) Filed: Aug. 5, 2020

(65) Prior Publication Data

US 2021/0040987 A1     Feb. 11, 2021

Related U.S. Application Data

(60) Provisional application No. 62/883,577, filed on Aug. 6, 2019.

(51) Int. Cl.
*F16C 19/52* (2006.01)
*F16C 41/00* (2006.01)
(Continued)

(52) U.S. Cl.
CPC .......... *F16C 19/522* (2013.01); *F16C 41/008* (2013.01); *G01L 5/0004* (2013.01); *G01M 13/045* (2013.01); *F16C 2233/00* (2013.01)

(58) Field of Classification Search
CPC .... F16C 19/522; F16C 23/086; F16C 35/047; F16C 41/008; F16C 43/04; F16C 2233/00; G01L 5/0004; G01M 13/045
(Continued)

(56) References Cited

U.S. PATENT DOCUMENTS

| 3,429,586 A | 2/1969 | Force |
| 4,118,933 A | 10/1978 | Coleman et al. |

(Continued)

FOREIGN PATENT DOCUMENTS

| CN | 110409294 A | * | 11/2019 | |
| DE | 3407619 A1 | * | 9/1985 | ........... G01L 5/0004 |

(Continued)

OTHER PUBLICATIONS

International Search Report and Written Opinion in corresponding International Patent Application No. PCT/US2020/45058, dated Jan. 7, 2021, in 12 pages.

(Continued)

*Primary Examiner* — Marcus Charles
(74) *Attorney, Agent, or Firm* — Knobbe, Martens, Olson & Bear, LLP

(57) ABSTRACT

A bearing assembly may include an integral sensor module retained within a bore in the bearing housing. The sensor module includes at least one strain gauge oriented to sense a compressive load acting on the bearing housing. The sensor module may be retained within the bore under an axial compressive load. The sensor module may include a power source and a wired or wireless communications module for transmitting information indicative of the compressive load to an external instrument or other system.

24 Claims, 14 Drawing Sheets

(51) Int. Cl.
*G01L 5/00* (2006.01)
*G01M 13/04* (2019.01)
*G01M 13/045* (2019.01)

(58) Field of Classification Search
USPC .................. 384/448; 74/763, 768, 781, 856
See application file for complete search history.

(56) References Cited

U.S. PATENT DOCUMENTS

| | | | |
|---|---|---|---|
| 5,503,030 | A | 4/1996 | Bankestrom |
| 5,777,240 | A | 7/1998 | Lefebvre et al. |
| 7,070,332 | B2 | 7/2006 | Östling et al. |
| 7,202,425 | B2 | 4/2007 | Knudsen et al. |
| 2003/0172740 | A1 | 9/2003 | Stevenson et al. |
| 2015/0338326 | A1 * | 11/2015 | Campbell ................ G01N 3/02 73/781 |
| 2017/0282940 | A1 * | 10/2017 | Rossi ........................ B61F 5/20 |
| 2018/0031446 | A1 * | 2/2018 | Winker ............... F16C 11/0647 |
| 2019/0203764 | A1 * | 7/2019 | Van der Ham ....... G01L 5/0004 |
| 2019/0203773 | A1 * | 7/2019 | Den Haak ............. G01L 5/0009 |

FOREIGN PATENT DOCUMENTS

| | | | | |
|---|---|---|---|---|
| DE | 102012006158 | A1 * | 10/2013 | ............ F16C 23/084 |
| DE | 102016217938 | A1 * | 3/2018 | ............. G01H 1/003 |
| DE | 102018104727 | A1 * | 9/2018 | ........... F16C 32/0446 |
| DE | 102017109537 | A1 * | 11/2018 | .............. F16C 19/52 |
| EP | 0429399 | A2 * | 5/1991 | ........... G01L 5/0004 |
| GB | 2527864 | A * | 1/2016 | .............. B63B 21/20 |
| GB | 2529193 | A * | 2/2016 | ............. F16C 33/586 |
| JP | 2006113736 | A * | 4/2006 | ............ F16C 41/008 |
| JP | 5736762 | B2 * | 6/2015 | ............ F16C 19/522 |
| JP | 2018004290 | A * | 1/2018 | ............ F16C 35/077 |
| KR | 102078182 | B1 * | 2/2020 | ........... F01D 25/164 |
| WO | WO-0212676 | A1 * | 2/2002 | ............... E21B 47/01 |
| WO | WO-2014154257 | A1 * | 10/2014 | ............ F16C 19/386 |
| WO | WO-2016001668 | A1 * | 1/2016 | .............. B63B 21/04 |
| WO | WO 2018/219379 | A1 | 12/2018 | |
| WO | WO 2021/026267 | A1 | 2/2021 | |

OTHER PUBLICATIONS

SKF Group, "SKF Load Sensing Bearings—for pumps and compressors" brochure, Nov. 2019, in 12 pages.

W. Chen et al., "Direct load monitoring of rolling bearing contacts using ultrasonic time of flight," Proceedings of the Royal Society A, vol. 471, Issue 2180, Aug. 2015, in 21 pages.

Honeywell Sensing and Control, "Test and Measurement Product Range Guide," Jul. 2014, in 24 pages.

* cited by examiner

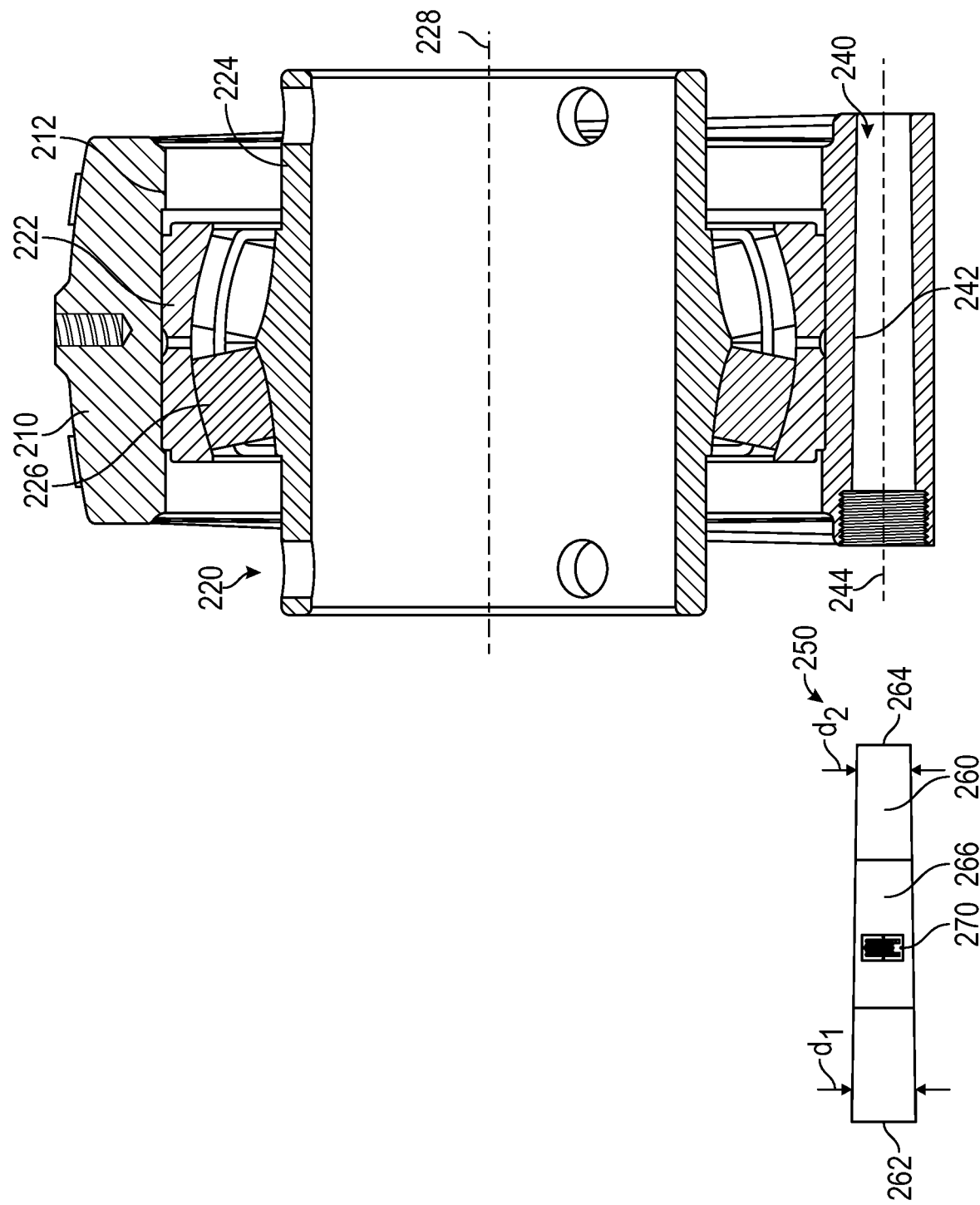

LOAD SENSING BEARING WITH INTEGRATED SENSOR MODULE

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

This application claims the benefit of U.S. Provisional Application No. 62/883,577, filed Aug. 6, 2019 and entitled LOAD SENSING BEARING WITH SENSOR MODULE, the disclosure of which is incorporated by reference in its entirety.

BACKGROUND

Field of the Disclosure

This invention relates generally to bearing assemblies with integrated sensors, and in particular to bearing assemblies with sensors configured to measure a load on the bearing assembly while the bearing assembly is in operation.

Description of the Related Art

It is often desirable to know the amount of load on a bearing while the bearing is in operation. In some arrangements, the measurement of the load on a bearing can require operation of the bearing to be suspended and partially or completely detached or uninstalled from a mounting surface before a load measurement can be made. If continuous operation of the bearing mechanism is needed, taking such a measurement can cause problems. Furthermore, shutdown and restarting of some mechanisms can cause stress on individual components of the mechanism. For example, in embodiments in which the mechanism includes a rotary structure such as a rotating biological collector, stoppage can result in undesired buildup of material in an uneven distribution on the rotating components, which can impact the long-term performance of the rotary structure.

SUMMARY

In a first broad aspect, a load-sensing bearing assembly is provided, comprising: a bearing housing; a bearing element retained within the bearing housing; a sensor bore formed in the bearing housing, the bore located between the bearing housing and a mounting face of the bearing housing; a sensor module disposed within the bore, the sensor module comprising: a sensor pin dimensioned to fit within the sensor bore; and a strain gauge supported by the sensor pin and oriented to provide an indication of a compressive load acting on the bearing assembly.

A portion of the bearing housing extending between the sensor bore and the bearing element can be a contiguous structure. The bearing assembly can include at least one retention mechanism configured to maintain an axial compressive load on the sensor pin when the sensor pin is disposed within the sensor bore. The sensor pin can have a tapered outer profile. The sensor pin can include at least one generally planar mounting surface, and wherein the strain gauge is mounted on the generally planar mounting surface.

The strain gauge comprises a plurality of elongate traces oriented in a direction generally perpendicular to a rotational axis of the bearing element. The sensor bore can extend in a direction substantially parallel to a rotational axis of the bearing element. In some embodiments, the sensor bore comprises a through hole. In certain variants, the sensor bore comprises a blind hole.

The sensor module can further include a controller configured to condition a signal from the strain gauge; a power source; and a communications module. The communications module can include a wireless communications module. The sensor module can further include a second strain gauge oriented to be unresponsive to a compressive load acting on the bearing assembly.

In another broad aspect, a sensor module configured to be integrally installed in a sensor bore in a sensor housing is provided, the sensor module comprising: a sensor pin extending along a longitudinal axis; a mounting surface; a strain gauge supported by the mounting surface and comprising a plurality of elongate traces oriented in a direction substantially perpendicular to the longitudinal axis of the sensor pin, the strain gauge configured to provide an output of a compressive load acting on the sensor pin in a direction perpendicular to the longitudinal axis of the bearing; a power source; and a communications module configured to transmit information indicative of the compressive load acting on the sensor pin.

The mounting surface can include a generally planar mounting surface. The sensor pin can have a tapered outer profile. The communications module can include a wireless communications module. The sensor module can further include a second strain gauge oriented to be unresponsive to a compressive load acting on the sensor pin in a direction perpendicular to the longitudinal axis of the bearing, the second strain gauge comprising a plurality of elongated traces oriented in a direction substantially perpendicular to the longitudinal axis of the sensor pin.

In another broad aspect, a method of integrally installing a sensor module into a bearing assembly is provided, the bearing assembly comprising a bearing housing, a bearing element retained within the bearing housing, and a sensor bore formed in the bearing housing, the method comprising: inserting a sensor module into the sensor bore in the bearing housing, the sensor module comprising a sensor pin dimensioned to fit within the sensor bore; and a strain gauge supported by the sensor pin and oriented to provide an indication of a compressive load acting on the bearing assembly; and securing the sensor module in place within the sensor bore.

Inserting the sensor module into the sensor bore in the bearing housing can be performed while the bearing assembly is secured to an external mounting surface. Inserting the sensor module into the sensor bore in the bearing housing can be performed while the bearing assembly is in operation.

The method can additionally include forming the sensor bore in the bearing housing of an installed bearing assembly prior to inserting the sensor module into the sensor bore in the bearing housing. Securing the sensor module in place within the sensor bore can additionally include securing the sensor module in place using a securement mechanism such that the sensor pin is under an axial compressive load.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise.

FIG. 2C is an exploded cross-sectional view schematically illustrating the bearing assembly of FIG. 2A with the sensor module shown removed from the bearing housing.

DETAILED DESCRIPTION

Figure 1:
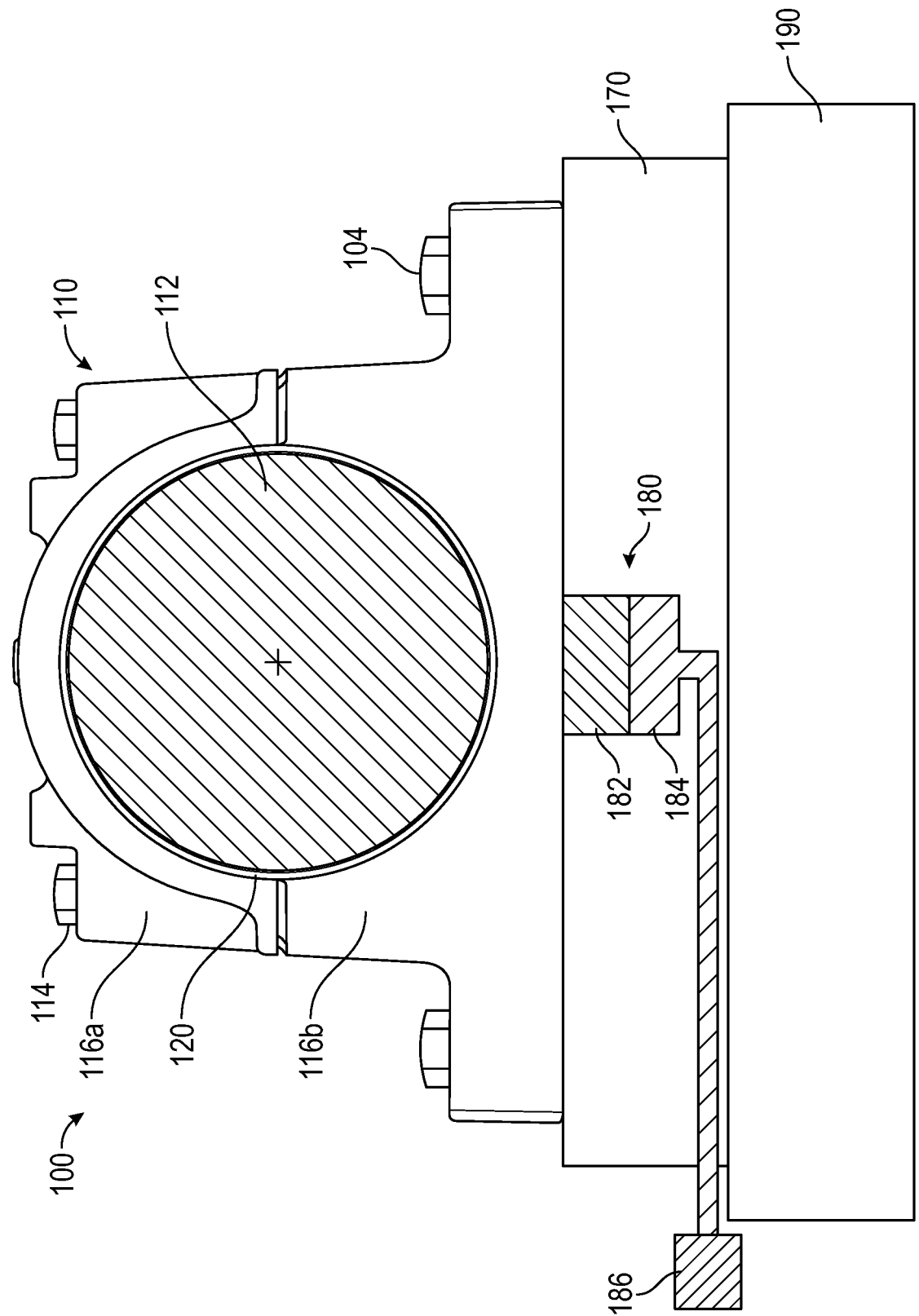
FIG. 1 is a front view schematically illustrating a bearing assembly installed in conjunction with a discrete load cell sensor assembly.

FIG. 1 is a perspective view schematically illustrating a bearing assembly installed in conjunction with a discrete load cell sensor assembly. The bearing assembly 100 includes a bearing housing 110 supporting a bearing element 120 or bearing insert retained therein. In the illustrated embodiment, the bearing housing 110 is a split bearing housing, comprising an upper housing portion 116a secured to a lower housing portion 116b by a plurality of housing bolts 114 or other suitable fasteners or another securement mechanism, to secure the bearing element 120 therebetween. In other embodiments, however, other bearing designs may be used. The bearing element 120 can in turn support a shaft or axle 102.

In some embodiments, the bearing assembly 100 can be used in the wastewater treatment industry, such as in the support bearings of a Rotating Biological Collector (RBC). An RBC can be similar to a water wheel that separates solids from gray water, and can be run in series to separate finer particles. RBCs suffer from unknown and eccentric loads. Measurements of these loads may be taken periodically to monitor the state of the RBCs.

In the illustrated embodiment, rather than being seated directly on a support block 190 or other external mounting surface, the bearing assembly 100 is seated on a discrete load cell assembly 170 or other load-sensing structure, which may include a hydraulic load cell 180. The hydraulic load cell 180 includes a piston 182 or other support platform overlying a hydraulic chamber 184 in fluid communication with a pressure gauge 186. The bearing assembly 100 may be partially disassembled before hydraulically jacking up the bearing assembly 100 and the load supported thereon to measure the load on the system via the load cell 180.

However, such a measurement can be labor-intensive, and can require, for example, the loosening of mounting bolts 104 to operate the hydraulic load cell 180 to obtain the load reading. Furthermore, the mounting structure of the bearing 100 may need to be altered to accommodate the placement of the load cell assembly 170. The inclusion of a discrete load cell assembly 170 can increase the overall height of the bearing mounting structure, and require further adjustments due to the added height. In addition, the operational lifetime of the load cell assembly may be short in comparison to the overall operational lifetime of the bearing assembly 100, as a hydraulic load cell can be fragile and can degrade well before the useful lifetime of a more robust bearing assembly. The comparatively short lifetime of a hydraulic load cell 180 can result in one or more labor-intensive replacements of the load cell assembly 170 over the lifetime of the bearing assembly 100.

In other embodiments, alternate sensing structures can be utilized which can be integrated directly into a bearing housing. By integrating the sensing structure into the bearing housing itself, the sensing structure can be included without alteration of the mounting arrangement of the bearing assembly. In some embodiments, the sensing structure may utilize a sensing mechanism which is more robust than a hydraulic load cell, providing a longer useful lifetime. In some embodiments, the sensing structure may be used to measure the load on the system during operation of the system. In some embodiments, the sensing structure can be used to measure the load on the system without manual operation of the sensor or manual adjustments to the sensor assembly. In various embodiments, the sensing structure can be installed into, and/or removed out of (e.g., separated from), the bearing housing without removing the mounting bolts.

Figure 2A:
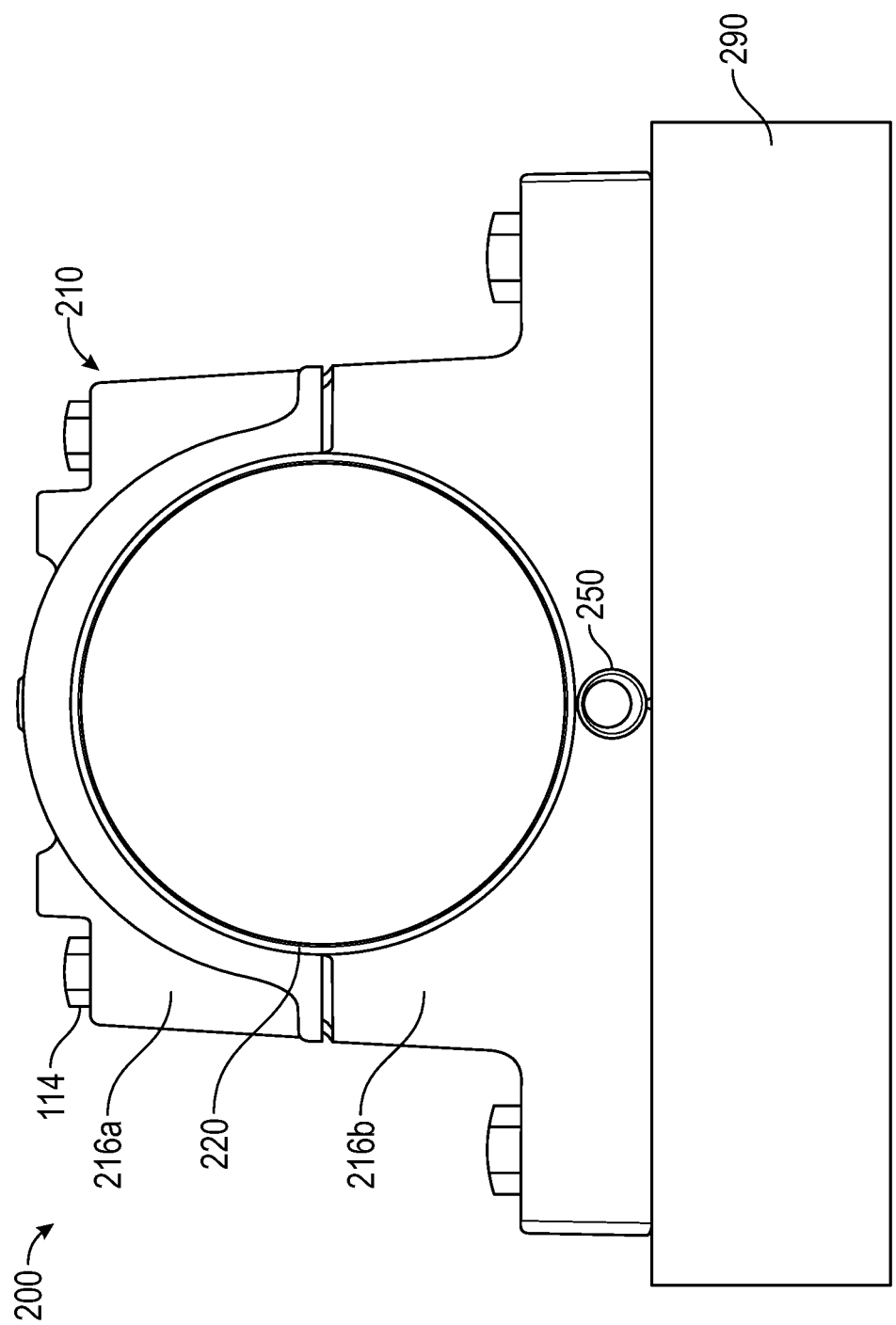
FIG. 2A is a front view schematically illustrating a bearing assembly including an integrated sensor module.
Figure 2B:
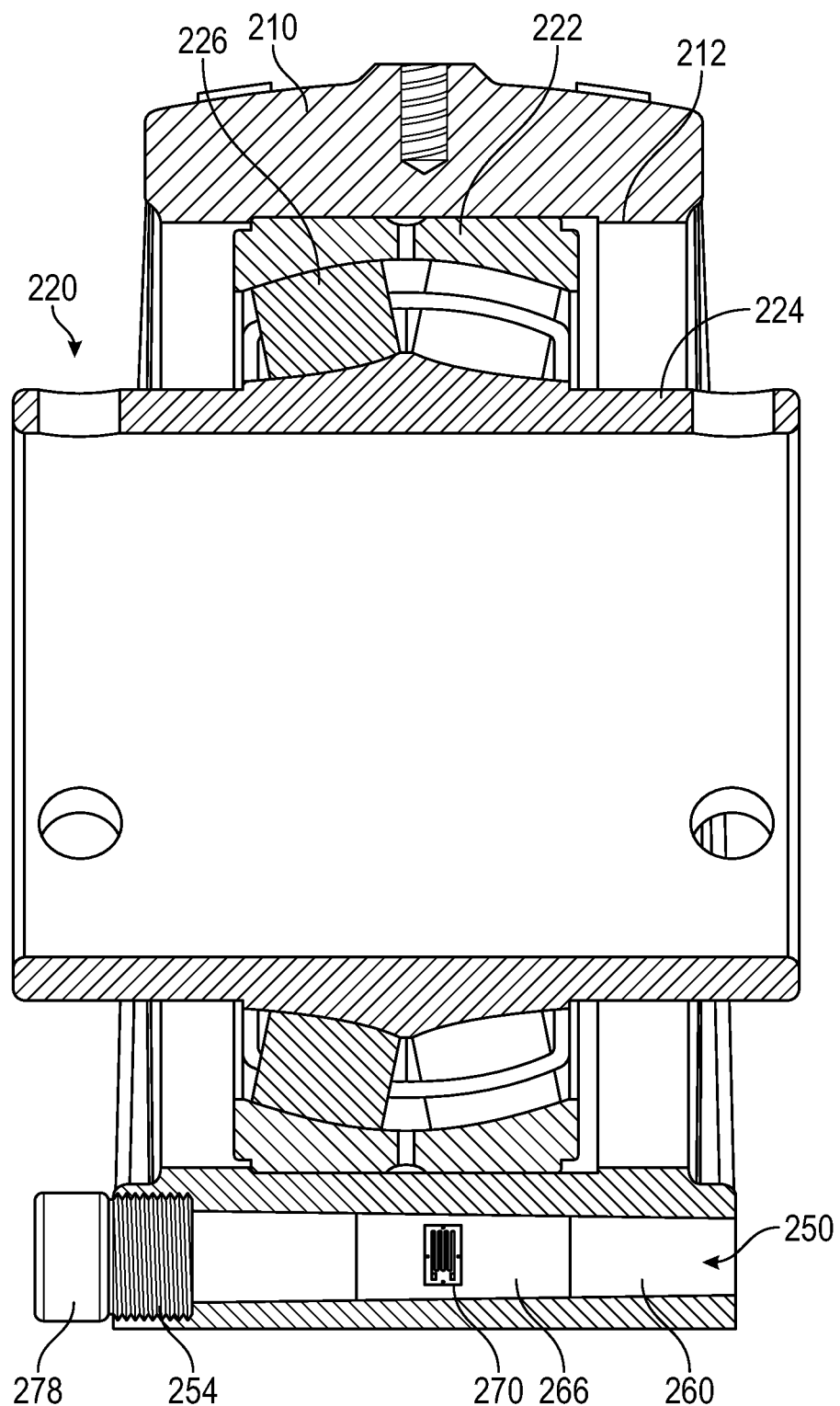
FIG. 2B is a cross-sectional view schematically illustrating the bearing assembly of FIG. 2A, taken along a vertical plane passing through the rotational axis of the bearing element of the bearing assembly.
Figure 2D:
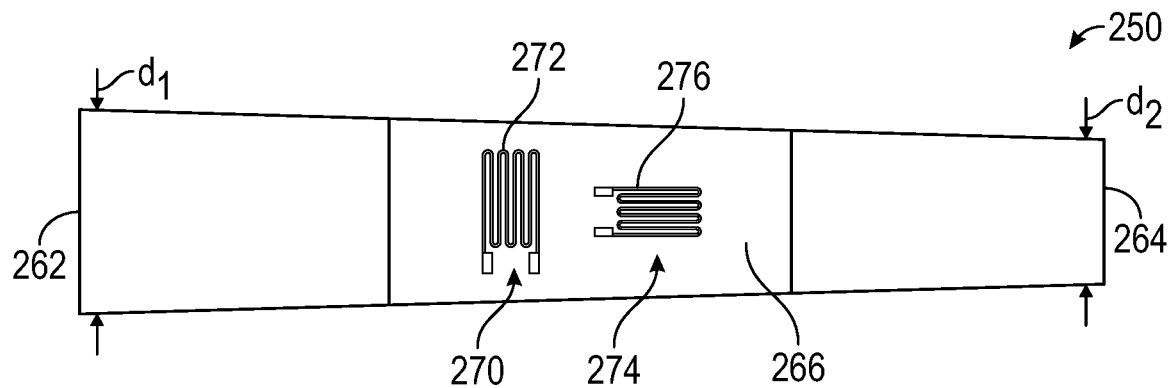
FIG. 2D is a side view of another embodiment of a sensor module including multiple strain gauges.

FIG. 2A is a front view schematically illustrating a bearing assembly including an integrated sensor module. FIG. 2B is a cross-sectional view schematically illustrating the bearing assembly of FIG. 2A, taken along a vertical plane passing through the rotational axis of the bearing element of the bearing assembly. FIG. 2C is an exploded cross-sectional view schematically illustrating the bearing assembly of FIG. 2A with the sensor module shown removed from the bearing housing. FIG. 2D is a side view of another embodiment of a sensor module including multiple strain gauges.

The bearing assembly 200 includes a bearing housing 210 having a bearing element 220 retained within a bore 212 in the bearing housing 210. Like the bearing housing 110 of FIG. 1, the bearing housing 210 is also illustrated as a split bearing housing with an upper housing portion 216a secured to a lower housing portion 216b by housing bolts 114, although a wide variety of other housing designs may also be used. In the illustrated embodiment, the bearing assembly 200 is depicted as a pillow block bearing, although other suitable bearing assembly designs may also be used. The bearing element 220 in the illustrated embodiment includes an outer race 222, an inner race 224, and a plurality of rolling elements 226 disposed between the inner race 224 and the outer race 222, facilitating rotation of the inner race 224 about a rotational axis 228 of the bearing element 220. In particular, the rotational axis 228 of the bearing element 220 may correspond to a rotational axis of an inner bearing element or ring, such as the inner race 224. The illustrated bearing element 220 is one exemplary design, but a wide variety of other bearing elements types and designs may also be used, depending on the operating conditions of the bearing assembly 200 and other factors. The bearing assembly 200 can be used in a wide variety of applications and industries, such as in the wastewater treatment industry (e.g., in the support bearings of an RBC).

In the illustrated embodiment, the bearing housing 210 includes a contiguous structure extending around the bearing element 220, although in other embodiments, the bearing housing may include a multipart structure, rather than a unitary structure. For example, the bearing housing may include an upper portion secured to a lower portion to retain the bearing element 220 therebetween. Although illustrated in a vertical orientation, the bearing housing may in other embodiments be secured to an external mounting surface 290 in other orientations. For example, the external mounting surface 290 may be a substantially vertical surface, such that the bearing assembly 200 is mounted on its side. In other embodiments, the bearing assembly 200 may be mounted to an external mounting surface 290 at any suitable angle.

The bearing housing 210 includes a sensor module 250 disposed within a sensor bore 240 or other slot or aperture within the bearing housing 210. In the illustrated embodiment, the sensor module 250 is located beneath the centerline of the bearing assembly 200. A longitudinal axis 244 of the sensor bore 240 can extend generally parallel to and/or be generally vertically aligned with the rotational axis 228 of the bearing element 220. The sensor module 250 is integral to (e.g., installed within) the bearing housing 210. In the illustrated embodiment, a contiguous solid section of the bearing housing 210 extends between the sensor bore 240 and the components of the bearing element 220 such as the outer race 222. For clarity, a side view of the sensor module 250 is shown in FIGS. 2B and 2C, rather than the cross-sectional view used to illustrate the remainder of the bearing assembly 200. So that an exemplary location of the strain gauge 270 can be shown, as the strain gauge 270 can be located out of the vertical plane passing through the rotational axis of the bearing element.

The sensor module 250 includes a support, such as a sensor pin 260, and at least one load sensor, such as a strain gauge 270, supported by the sensor pin 260. The strain gauge 270 may be disposed on a mounting surface 266 of the sensor pin 260. The mounting surface 266 may be a planar mounting surface. The strain gage 270 can include a plurality of trace elements 272. The strain gauge 270 may be oriented such that the trace elements 272 are generally vertically oriented when the sensor module 250 is seated within the sensor bore 240, to allow the strain gauge 270 to provide an indication of a compressive load on the system.

The strain gauge 270 may be positioned underneath the applied load of the bearing assembly 200. For example, the strain gauge 270 can be located in the bearing assembly 200 such that strain gauge 270 registers load applied to the bearing housing, such as compressive or other load applied by the shaft or axle. The strain gauge 270 may be longitudinally centrally positioned within the bearing housing 210 and/or the bore 240. In some embodiments, such as the illustrated embodiment, the sensor bore 240 extends entirely or nearly entirely through the bearing housing 210. The strain gauge 270 may be located near the longitudinal midpoint of the sensor bore 240, as seen in FIG. 2B. However, in other embodiments, the strain gauge 270 may be located in other locations.

The sensor module 250 may be retained within the sensor bore 240 by a retaining element, such as a nut 254, which may have a threaded portion to engage one or both of the sensor bore 240 or the sensor pin 260 to retain the sensor module 250 in place. In other embodiments, other suitable retaining structures may be used, including a threaded insert, a cotter pin, a threaded pin, or any other suitable mechanism for retaining the sensor module 250 in place. In some embodiments, a retention mechanism such as retaining nut 254 may be provided at both ends of a sensor bore 240 extending through the bearing housing 210.

In some embodiments, the sensor pin 260 may include a slight taper. A cross-sectional diameter $d_1$ at a location near the proximal end 262 of the sensor pin 260 can be larger than a cross-sectional diameter $d_2$ at a location near the distal end 262 of the sensor pin 260. The sensor bore 240 in the bearing housing 210 may have a similar or matching tapered shape to ensure a close fit and/or mating abutment between the outer surface or surfaces of the sensor pin 260 and the interior surface 242 of the sensor bore 240. The sensor module 250 and bore 240 can be designed in such a way that line to line contact, or a slight interference fit, between the sensor pin 260 and the bearing housing 210 is achieved. In particular, the edges of a planar mounting surface 266 of the sensor pin 260 on which the strain gauge 270 is mounted can be in contact with the interior surface of the sensor bore 240.

In addition to the tapered shape of the sensor pin 260 and the sensor bore 240, the engagement of the outer surface or surfaces of the sensor pin 260 and the interior surface 242 of the sensor bore 240 can be facilitated by maintaining the sensor pin 260 under an axial compressive load. Under such an axial compressive load, the cross-sectional shape of the sensor pin 260 can expand to ensure contact between the sensor pin 260 and the interior surface 242 of the sensor bore 240. This axial compressive load can be provided, for example, through the use of the threaded retaining nut 254 or other suitable retention structure. In other embodiments, however, the sensor pin 260 need not be under an axial compressive load. In some embodiments in which the sensor pin 260 and the sensor bore 240 are dimensioned to be in a close fit, the sensor pin 260 can be under an axial tensile load without impacting the fit of the sensor pin 260. For example, in an embodiment in which the sensor pin 260 is secured in place using a threaded nut or other securement mechanism at each end, the sensor pin 260 may be under an axial tensile load, and a close fit between the sensor pin 260 and the sensor bore 240 may be maintained.

When the sensor module 250 is secured within the sensor bore 240, the strain on the housing 210 resulting from a load on the bearing assembly (e.g., from the shaft or axle) 200 is transferred to the sensor body 260, causing a corresponding strain in the sensor body 260. The strain gauge 270 of the sensor module 250 can provide an indication of the magnitude of the sensor body strain. This measurement may be performed while the bearing assembly 200 is in operation, allowing load measurements to be taken without shutting down machinery coupled to or supported by the bearing assembly 200, or otherwise changing the state of the machinery.

In some embodiments, the sensor module 250 may include one or more additional sensors, such as additional strain gauges. FIG. 2D is a side view of another embodiment of a sensor module which includes two strain gauges. For example, in some embodiments, a second strain gauge 274 may be installed in an orientation in which the second strain gauge 274 is unresponsive to a compressive load acting on the bearing. In some such embodiments, such a strain gauge 274 may be installed on the same mounting surface 266 or a parallel mounting surface, and oriented such that the elongate traces 276 or wires of the second strain gauge 274 are oriented perpendicular to the elongate traces 272 or wires of the primary strain gauge 270. For example, rather than being oriented in a direction perpendicular to the rotational axis of the bearing element, the elongate traces 276 of the secondary compensatory strain gauge 274 are instead oriented parallel to the rotational axis of the bearing element. The output of such a compensatory strain gauge 274 may be used, for example, to provide an indication of strain in the sensor pin 260 resulting from thermal expansion of the sensor pin in response to temperature changes. Some embodiments can include a temperature sensor, in addition to or in place of a compensatory strain gauge.

In some embodiments, the sensor module 250 can be a smart module which may include, for example, a power source and a communications module 278 in addition to the strain gauge 270. In other embodiments, the sensor module 250 can include a strain gauge 270 and a connector which enables the sensor module 250 connected to another instrument or device which can utilize the strain gauge 270 of the sensor module to measure the load on the bearing assembly 200.

Figure 3:
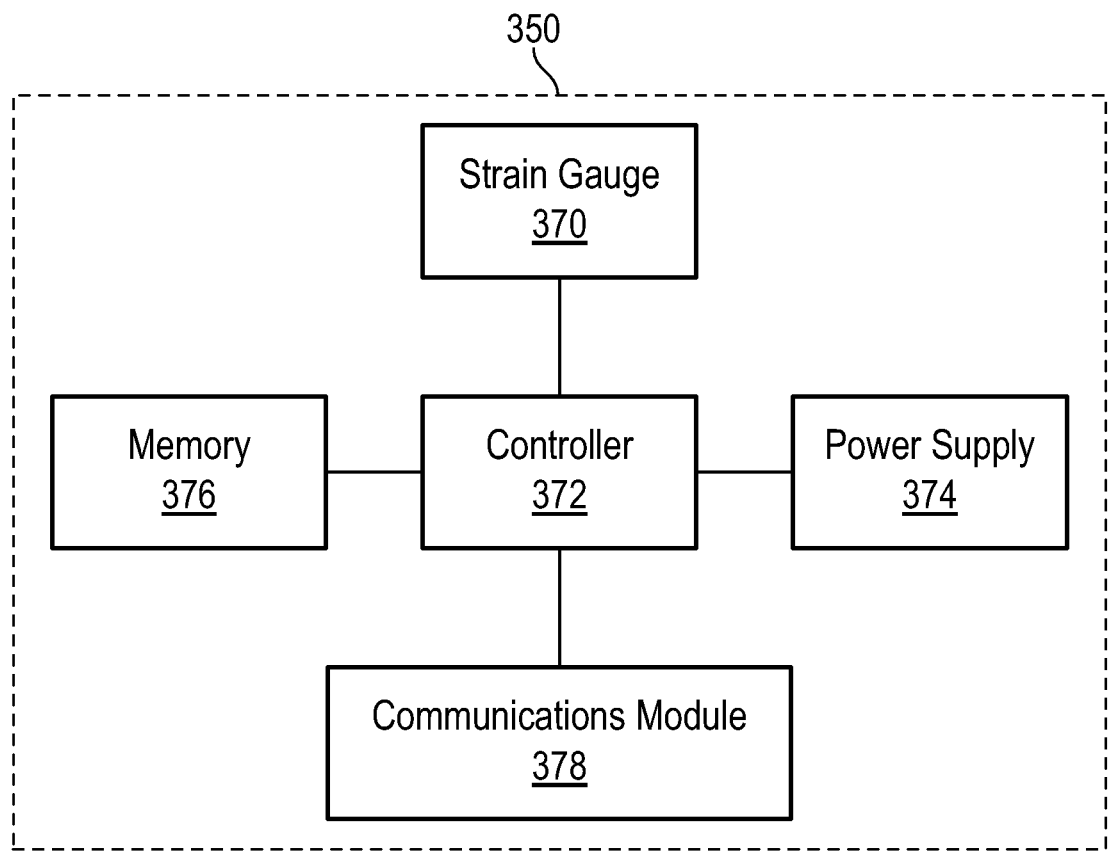
FIG. 3 schematically illustrates a smart sensor module.

FIG. 3 schematically illustrates a smart sensor module 350 which includes additional components in addition to the strain gauge 370. In particular, the embodiment of smart sensor module 350 illustrated in FIG. 3 includes a controller 372, which may include a processor, control circuitry, or another suitable electronics package, in electrical communication with the strain gauge 370 and/or other sensors (e.g., additional strain gauge, temperature sensor, etc.). The smart sensor module 350 also includes a power supply 374 in electrical communication with the controller 372. The power supply 374 may be a battery, a wired power source, or any other suitable power source. The controller 372 can condition a signal received from the strain gauge 370 to obtain an output indicative of the load on the bearing.

In some embodiments, the controller 372, or other suitable electronic component or component, can store the output of the strain gauge 370 in a memory 376 for later processing, such as to provide a record of the operational history of a bearing. In some embodiments the control circuitry 372 can transmit the output data using a communications module 378 to another instrument or device. In some embodiments, the communications module 378 may be a wireless communications module, and may include a transmitter or transceiver configured to wirelessly transmit data using any suitable wireless communications protocol. In some embodiments, the communications module 378 may be a wired communications module configured to transmit data over a wired connection using any suitable communication protocol. This digitized measurement data can be provided to a remote and/or centralized instrument, device, system or location for use in monitoring and analysis, such as to detect operational trends. For example, the sensor module may be used in conjunction with a Sensi-Torq™ system installed with a rotating biological contactor to supplement the data gathering or analysis performed by the Sensi-Torq™ system.

In some embodiments, the sensor module 350 may be configured to provide detailed output of specific data to an external system or instrument. For example, the sensor module 350 may be configured to send one or more of load data, battery data, or temperature data, or any other type of data. In some embodiments, the sensor module 350 may be configured to provide such information directly, while in other embodiments, the sensor module may be configured to provide information, data, or signals indicative of such information, such as direct sensor output or partially processed or conditioned sensor output, for further conditioning or calibration by an external system or instrument. The output indication provided by the sensor module 350 may be used, for example, in data analysis to detect trends in the loading of a bearing assembly. Such analysis may be performed remotely and/or within the sensor module 350 itself.

In some embodiments, the load information provided by the sensor module 350 may be indicative of a total load on the bearing assembly. However, in other embodiments, the nature of load information provided by the sensor module 350 may be dependent in part upon the sampling rate of the sensor module 350 relative to the eccentricity of a load applied to the sensor module 350. For example, in some embodiments, the sensor module 350 may have a sampling rate which is greater than a rotational rate of a rotary mechanism supported by the bearing assembly. In such an embodiment, the sensor module 350 may provide an output indicative of an eccentric load on the bearing assembly, in addition to or in place of an output indicative of a total load on the bearing assembly. In other embodiments, if a sampling window is short in comparison to a rotational period of a rotary mechanism supported by the bearing assembly, even if the sampling rate is not, the load output may be analyzed to provide an indication of an eccentric load on the bearing, in addition to a total load on the bearing.

In other embodiments, the sensor module 350 may be configured to provide a general indication of the state of the bearing assembly. For example, the sensor module 350 may be configured to provide a general indication of whether the bearing assembly is loaded within an acceptable range or is overloaded. In addition, the sensor module 350 may be configured to provide an indication of whether the loading on a bearing assembly is approaching an overloaded state. In some embodiments, this generalized indication may be provided in addition to certain detailed output information.

Although schematically illustrated as components of a single structure, certain components of smart sensor module 350 may be configured to be retained in a position outside of a sensor bore. For example, in an embodiment in which the communications module 378 is a wireless communication module, all or part of the communications module 378 may be located or extend outside of the sensor bore when the smart sensor module 350 is installed in the sensor bore. In other embodiments, the communications module 378 may be connected to other components of the smart sensor module 350 by a wire of suitable length, allowing placement of the communications module 378 at a suitable location for transmission of wireless signals.

In some embodiments, additional information may be used to correlate the strain gauge output with the magnitude of the bearing load. In some embodiments, this correlation information may be determined based at least in part on the design of the bearing and the sensor module. In other embodiments, the correlation information may be empirically determined, such as through the use of a calibration procedure in which the response of the sensor module is measured while under known applied loads. In some embodiments, this calibration process may be performed before a smart bearing assembly is fully installed, while in other embodiments, this calibration process may be performed after the smart bearing assembly is installed. In some embodiments, a calibration process may be performed after the smart bearing assembly is installed to compensate for or otherwise determine or calculate a static load which will be applied to the bearing assembly in use. For example, the weight of an RBC supported by the bearing assembly may result in a non-operation bias or static load on the system. The determination and/or compensation based on this compensation may allow a data reviewer to review load information based on a zero-point value. In addition, after an unload, the data may offset from this bias, and this may provide a helpful data point to determine whether additional calibration should be performed, or whether the system remains properly calibrated.

In some embodiments, a bearing assembly may be manufactured with a sensor bore or slot, and a sensor module may be provided which is dimensioned to fit therein. In such an embodiment, little or no calibration may be required. In some embodiments, the bearing housing is molded, cast, or otherwise formed with the bore included.

In other embodiments, a sensor module may be retrofitted into an existing bearing assembly, such as by forming a sensor bore or slot in an existing bearing housing and installing a sensor module therein. In some embodiments, this installation can be performed in place, without uninstalling an existing bearing assembly. In various embodiments, the sensor module is configured to be installed without loosening and/or removing the mounting bolts 104 and/or moving the housing 110. In several implementations, in operational use, the sensor module is received within the bearing housing 110 and/or is not positioned under the bearing housing 110 (e.g., is not on or under a foot or feet of the bearing housing 110).

Integrated sensor modules, such as embodiments of sensor modules described herein, which utilize strain gauges installed within a bore or slot in the bearing housing, may be more robust, convenient, serviceable, and/or accurate, than other load sensing mechanisms, such as hydraulic load cells and/or sensor modules located below the bearing housing or otherwise not part of the bearing housing itself. Integrated sensor modules may have a longer operational lifetime. In addition to the comparative robustness of strain gauges, the installation of a strain gauge within a bore can serve to protect the strain gauge from damage, further increasing the lifetime of the sensor module. The control circuitry can require little power to operate, and a battery can provide power for a long period of time without the need for replacement. In some embodiments, the sensor module may be externally powered, which may further increase the operational lifetime of the device.

In addition, if needed, the bearing assembly may be easily repaired or replaced in the field, without the need to detach the bearing assembly from the external mounting surface to replace a sensor module. Such a repair or replacement may be performed, in some circumstances, without the need to suspend the operation of the bearing assembly or the associated machinery and/or without the need to move (e.g., raise) the bearing assembly or the machinery.

Although initially described in the context of rotating biological connectors, embodiments of integral sensor modules can be used in conjunction with a wide number of other bearing mechanisms and systems. Because such integral sensor modules can be installed without altering the height or other structure of a bearing mount, integral load sensor modules of the type described herein can be readily incorporated into other systems. For example, embodiments of integral sensor modules can be integrated into motors to sense loads acting on the motors. Embodiments of integral sensor modules can also be integrated into components of conveyor mechanisms, such as in a tailpully bearing of a conveyor mechanism.

Figure 4A:
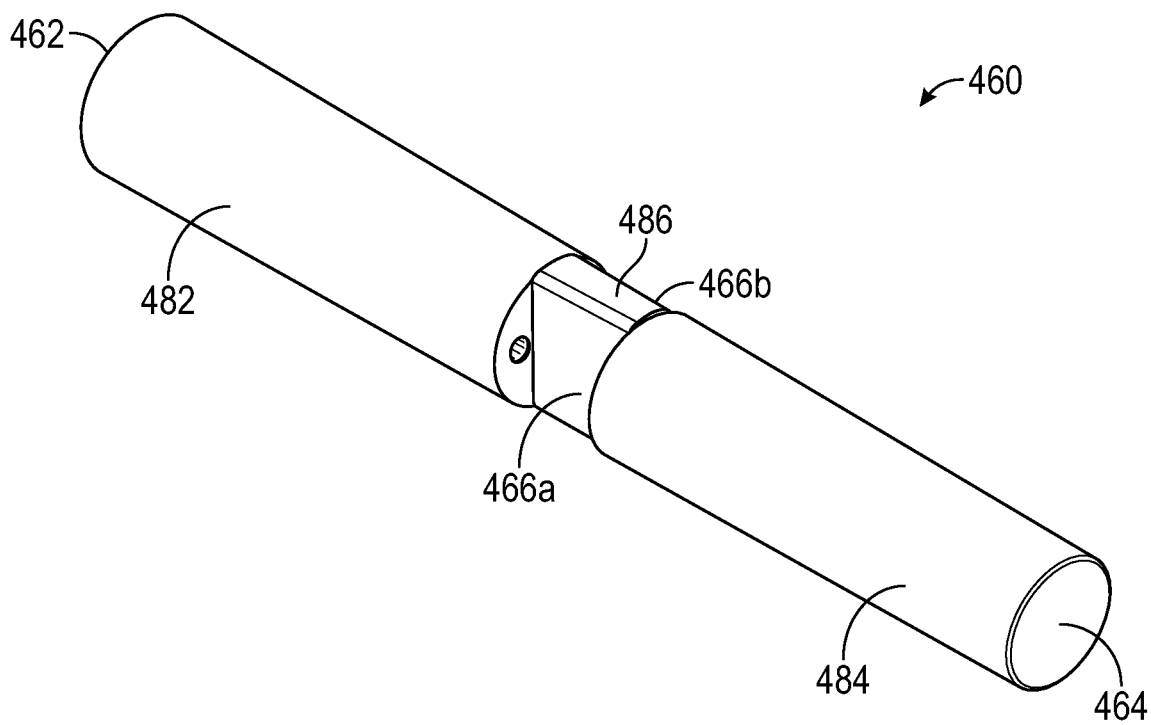
FIG. 4A is a perspective view illustrating an embodiment of a sensor pin.
Figure 4B:
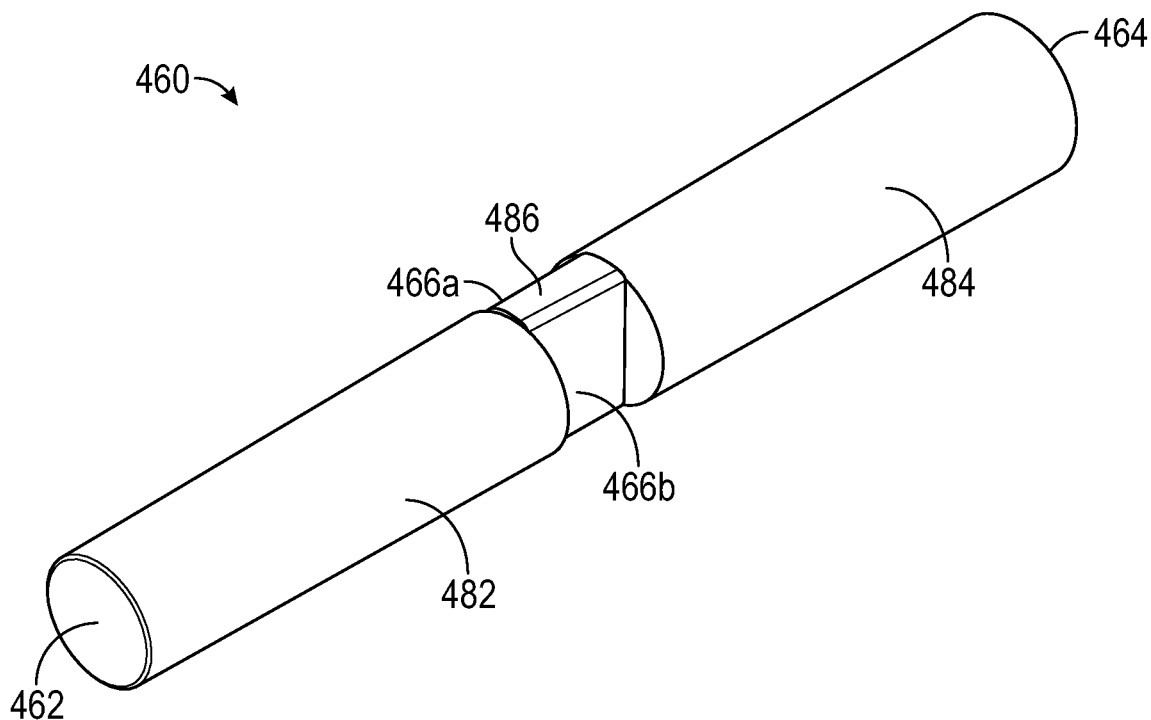
FIG. 4B is another perspective view of the sensor pin of FIG. 4A, seen from the opposite side of the sensor pin as FIG. 4A.
Figure 4C:
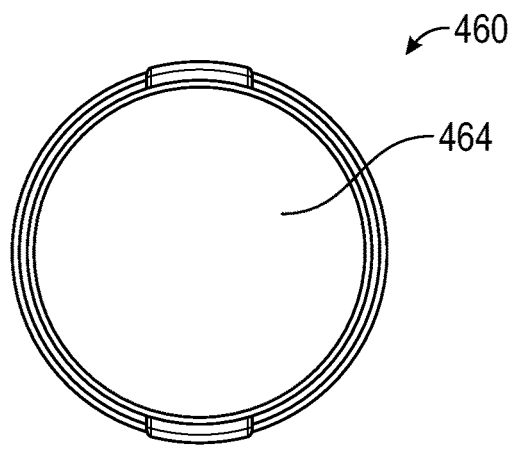
FIG. 4C is an end-on view of the sensor pin of FIG. 4A, viewed from a point along a longitudinal axis of the sensor pin.
Figure 4D:
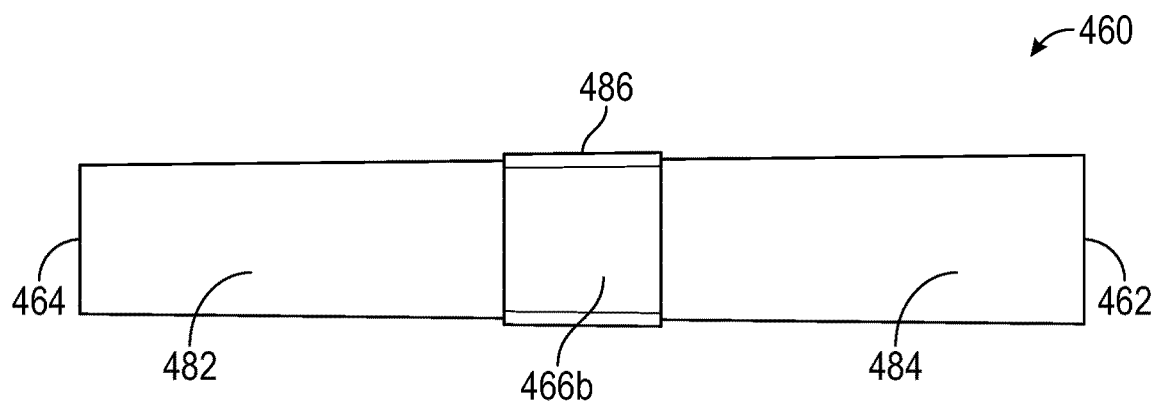
FIG. 4D is a side plan view of the sensor pin of FIG. 4A.
Figure 4E:
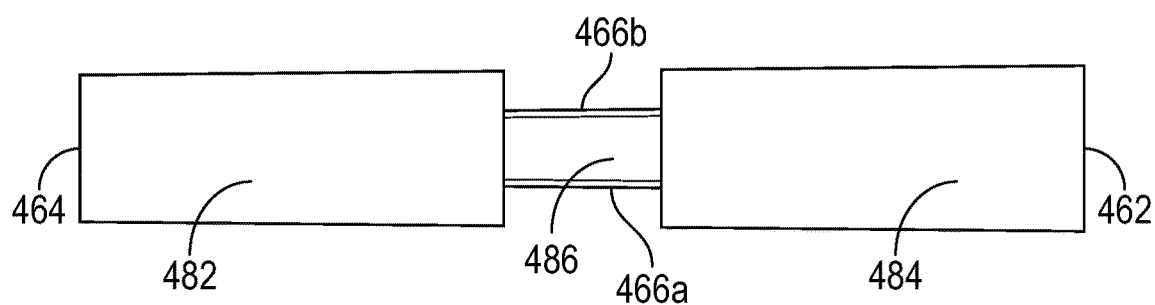
FIG. 4E is a top plan view of the sensor pin of FIG. 4A.

FIG. 4A is a perspective view illustrating an embodiment of a sensor pin. FIG. 4B is another perspective view of the sensor pin of FIG. 4A, seen from the opposite side of the sensor pin as FIG. 4A. FIG. 4C is an end-on view of the sensor pin of FIG. 4A, viewed from a point along a longitudinal axis of the sensor pin. FIG. 4D is a side plan view of the sensor pin of FIG. 4A. FIG. 4E is a top plan view of the sensor pin of FIG. 4A. The sensor pin 460 of FIG. 4A includes a central section 486, a proximal section 482 extending between the proximal end 462 and the central section 486, and a distal section 484 extending between the central section 486 and the distal end 464. In some embodiments, the proximal section 482 and the distal section 484 can include a slight taper such that they each have a frustoconical shape.

The central section 486 includes first and second generally planar faces 446a and 466b, which may extend parallel to one another. One or both of the first and second faces 446a and 446b may serve as a mounting surface for a strain gauge. In some implementations, the pin can include one or more slots. For example, as illustrated, the central section 486 can include slots.

In some embodiments, the central section 486 may have an outer diameter which extends in at least some locations beyond a common frustoconical shape defined by the outer surfaces of proximal section 482 and distal section 484. At least a portion of the central section 486 may jut out from longitudinally adjacent portions of the sensor pin 460. This protrusion can ensure, given suitable dimensions of the sensor pin 460 and a sensor bore in which the sensor pin 460 is seated, that the section of the sensor pin on which a strain gauge is disposed are in contact with the interior surface of the sensor bore. This arrangement can concentrate the load through the strain gauge.

Figure 5:
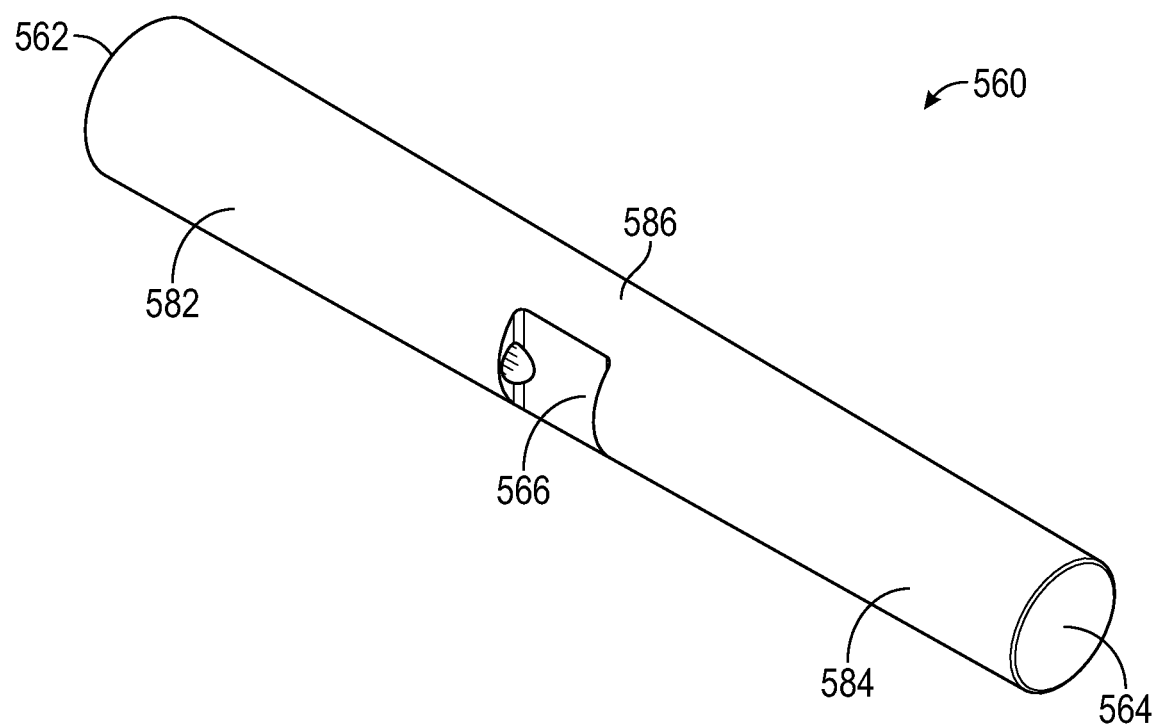
FIG. 5 is a perspective view illustrating one embodiment of a sensor pin, the sensor pin including a central protruding section.

FIG. 5 is a perspective view illustrating another embodiment of a sensor pin. The sensor pin 560 of FIG. 5 also includes a central section 586, a proximal section 582 extending between the proximal end 562 and the central section 586, and a distal section 584 extending between the central section 586 and the distal end 564. In the illustrated embodiment, a single generally planar face 566 is visible in the central section 586, but in some embodiments, a similar generally planar face may be formed on the opposite side of the central section 586.

The sensor pin 560 differs from the sensor pin 460 of FIG. 4A in that the central section 586 does not protrude from the longitudinally adjacent portions of the sensor pin 560. Instead, the central section 586 shares a common frusto-conical profile with the proximal section 582 and the distal section 584. The sensor pin 560 also differs from the sensor pin 460 of FIG. 4A in that the notch which defines the generally planar face 566 is shallower than the notch defining the generally planar face 466a of the sensor pin 460 of FIG. 4A. The height of the generally planar face 566 is therefore shorter than the generally planar face 466a of the sensor pin 460 of FIG. 4A, given similar overall dimensions of the sensor pins.

Figure 6A:
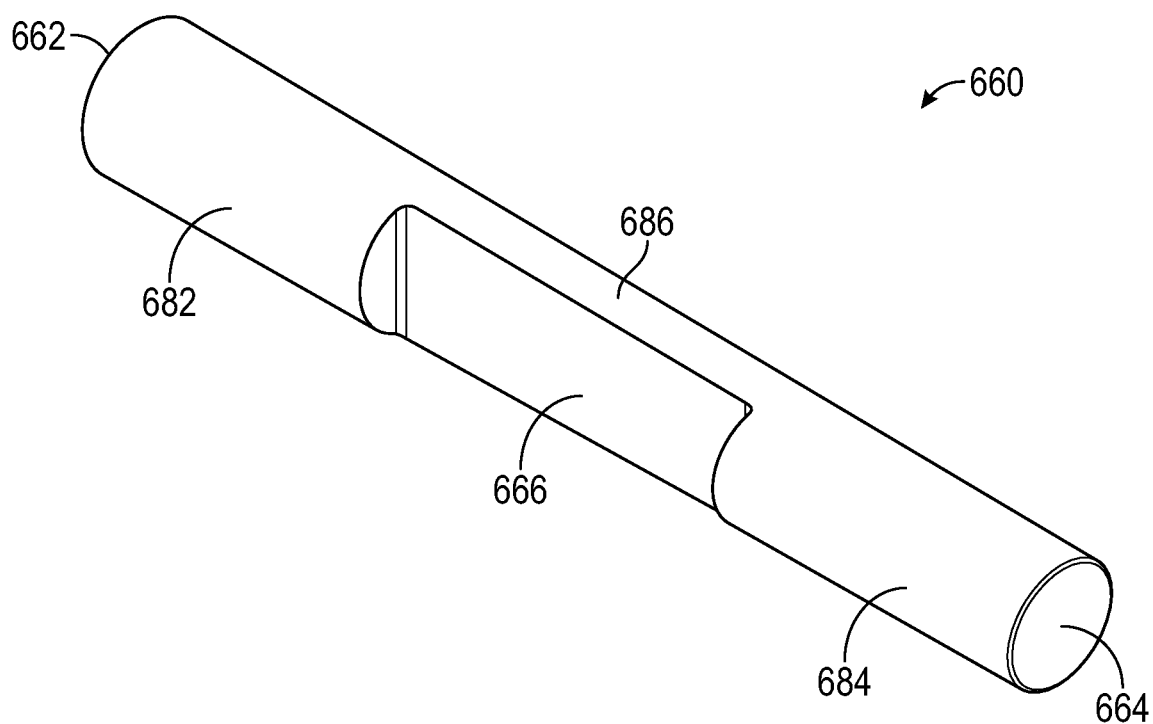
FIG. 6A is a perspective view illustrating another embodiment of a sensor pin including a mid-span cutout.
Figure 6B:
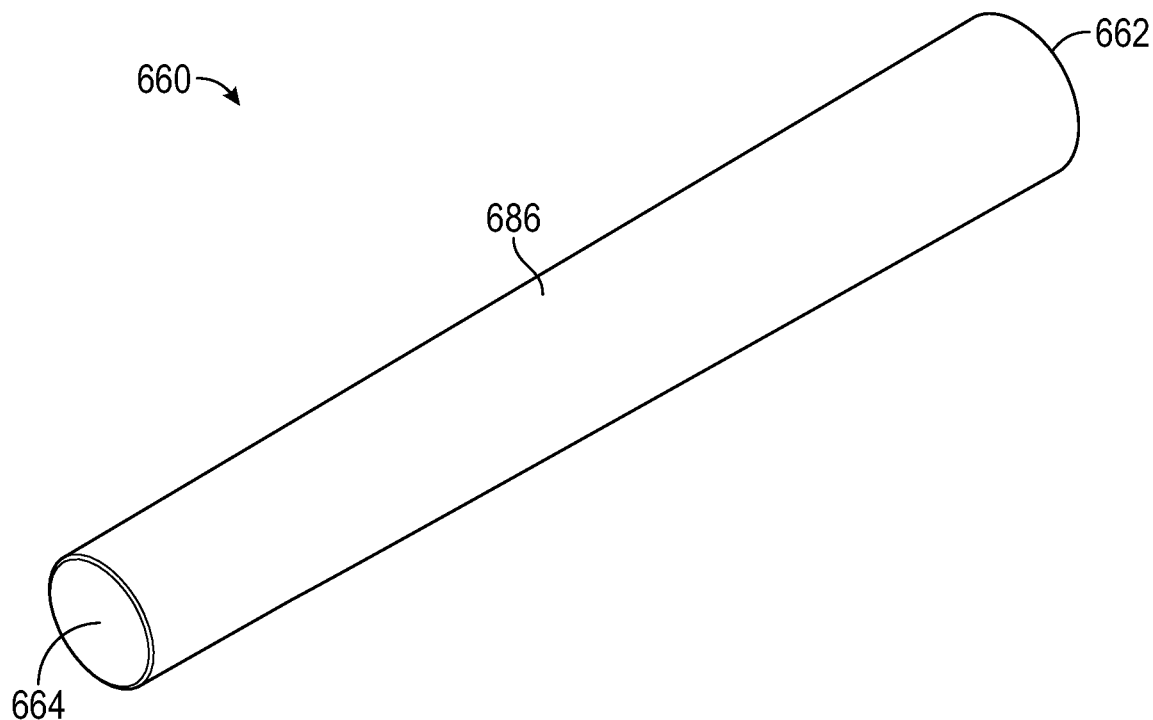
FIG. 6B is another perspective view of the sensor pin of FIG. 6A, seen from the opposite side of the sensor pin as FIG. 6A.
Figure 6C:
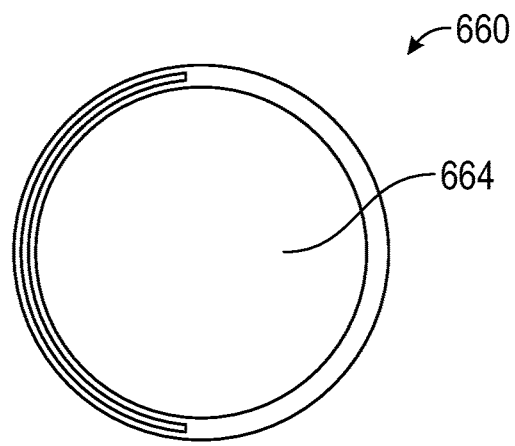
FIG. 6C is an end-on view of the sensor pin of FIG. 6A, viewed from a point along a longitudinal axis of the sensor pin.
Figure 6D:
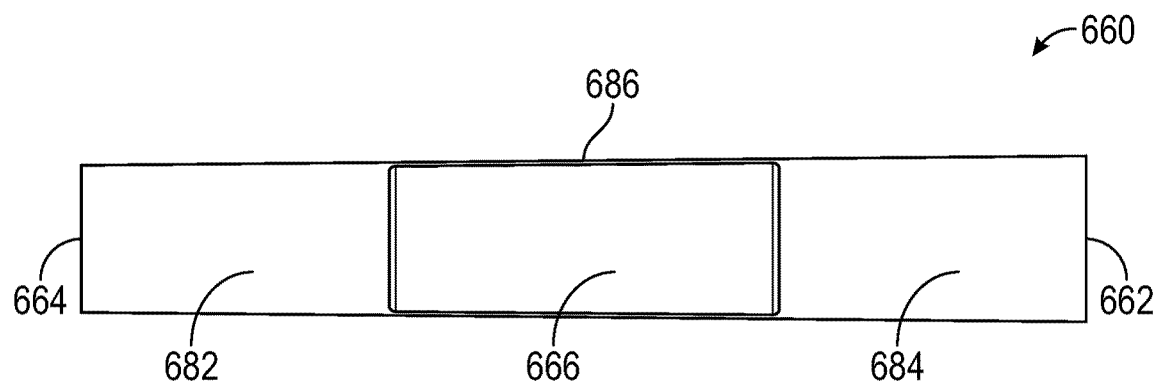
FIG. 6D is a side plan view of the sensor pin of FIG. 6A.
Figure 6E:
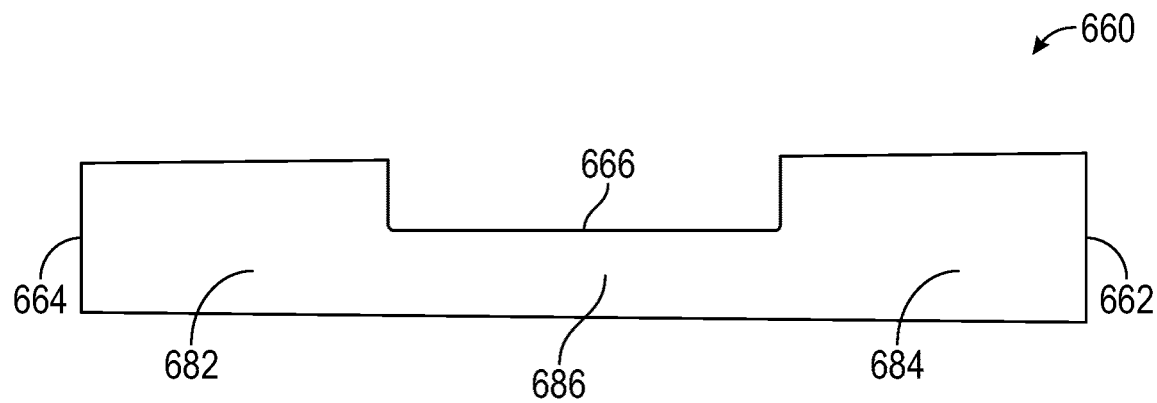
FIG. 6E is a bottom view of the sensor pin of FIG. 6A.

FIG. 6A is a perspective view illustrating another embodiment of a sensor pin. FIG. 6B is another perspective view of the sensor pin of FIG. 6A, seen from the opposite side of the sensor pin as FIG. 6A. FIG. 6C is an end-on view of the sensor pin of FIG. 6A, viewed from a point along a longitudinal axis of the sensor pin. FIG. 6D is a side plan view of the sensor pin of FIG. 6A. FIG. 6E is a bottom view of the sensor pin of FIG. 6A. The sensor pin 660 of FIG. 6A also includes a central section 686, a proximal section 682 extending between the proximal end 662 and the central section 686, and a distal section 684 extending between the central section 686 and the distal end 664.

The sensor pin 660 differs from the sensor pin 560 of FIG. 5 in that the notch or notches defining the central section 686 is both deeper and longitudinally longer, so that the size of the generally planar face 666 is larger in both a longitudinal and a transverse direction than the generally planar face 566 of FIG. 5. Such an arrangement can allow the use of a larger strain gauge oriented perpendicular to the longitudinal axis of the sensor pin 660, and can also facilitate the inclusion of multiple strain gauges adjacent to one another on a single mounting surface of the sensor pin, such as illustrated in the embodiment of FIG. 2D.

In some embodiments, the central section 686 may include a notch on only one side of the central section 686. In other embodiments, the central section 686 may also include a notch on the opposite side of the central section 686, defining a second generally planar face parallel to the generally planar face 666.

Figure 7:
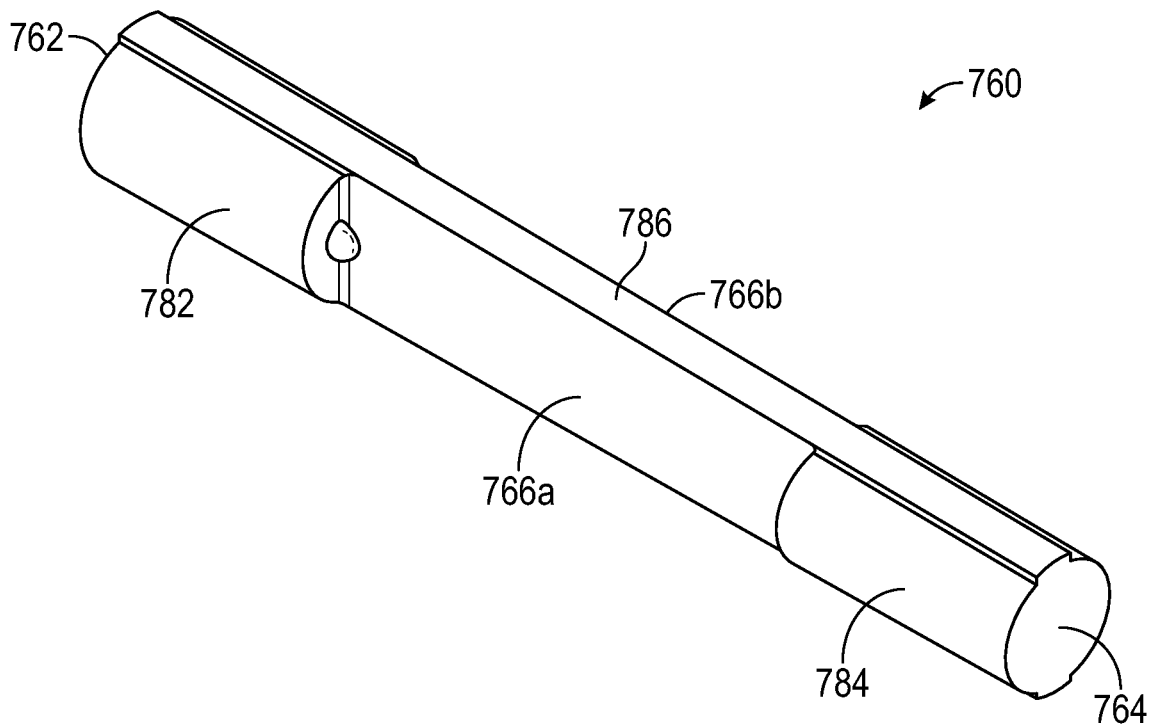
FIG. 7 is a perspective view illustrating another embodiment of a sensor pin, the sensor pin including a longitudinally extending central rib portion.

FIG. 7 is a perspective view illustrating another embodiment of a sensor pin. The sensor pin 760 of FIG. 7 also includes a central section 786, a proximal section 782 extending between the proximal end 762 and the central section 786, and a distal section 784 extending between the central section 786 and the distal end 764.

The sensor pin 760 of FIG. 7 is similar in certain aspects to the sensor pin 460 of FIG. 4A, in that the central section 786 extends radially outward in certain directions a greater distance than portions of longitudinally adjacent sections of the sensor pin 760. However, the proximal section 782 and the distal section 784 of the sensor pin 760 are not radially symmetric. Instead, the proximal section 782 and the distal section 784 of the sensor pin 760 also include radial portions which extend radially outward a greater distance than other radial portions of these sections. The sensor pin 760 thus has a central rib portion extending the longitudinal length of the sensor pin 760 which extends radially outward a greater distance than the portions to either side of the central rib portion.

Figure 8:
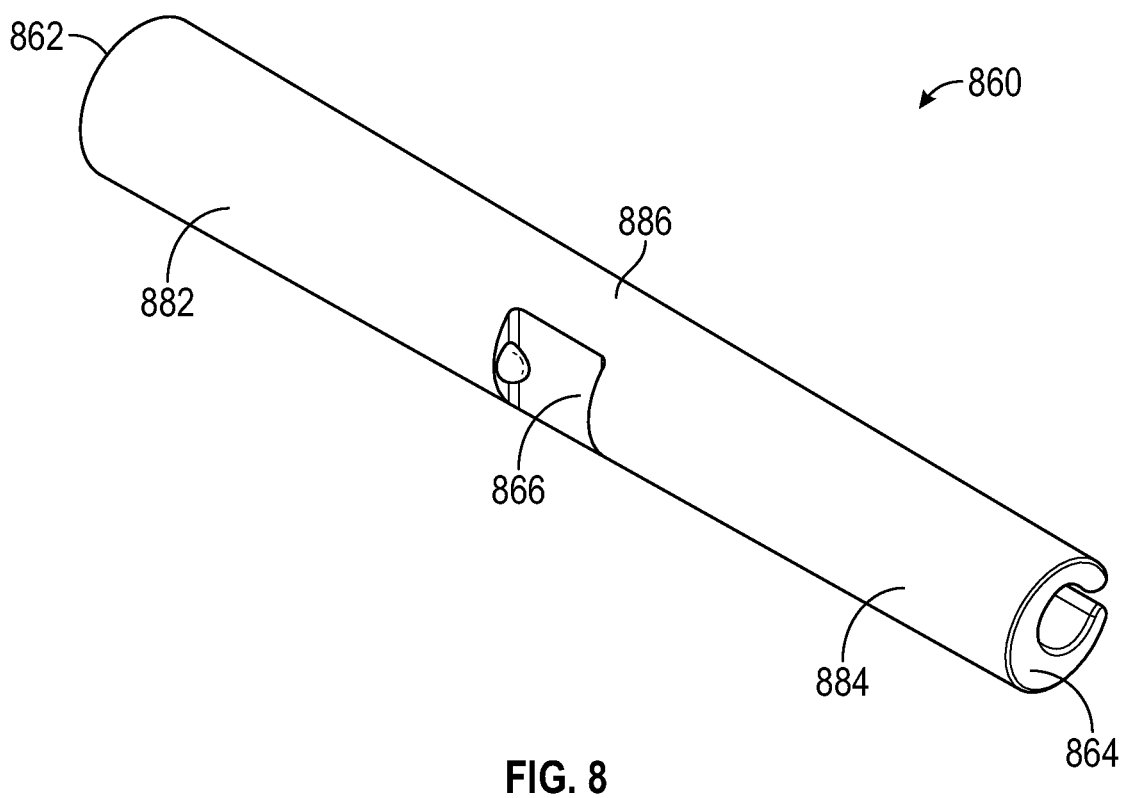
FIG. 8 is a perspective view illustrating another embodiment of a sensor pin, the sensor pin having a C-shaped cross-sectional shape.

FIG. 8 is a perspective view illustrating another embodiment of a sensor pin. The sensor pin 860 of FIG. 8 also includes a central section 886, a proximal section 882 extending between the proximal end 862 and the central section 886, and a distal section 884 extending between the central section 886 and the distal end 864. However, the sensor pin 860 differs from the previously discussed embodiments of sensor pins in that the sensor pin 860 has a C-shaped cross-sectional shape along at least a portion of its longitudinal length. The sensor pin 860 also includes a notch opposite the open side of the cross-sectional C-shape which defines a generally planar face 866.

In an embodiment in which the C-shaped cross-sectional shape is proportional to the overall width along the length of the sensor pin 860, the cross-sectional C-shape can constrain the depth of the notch. In other embodiments, however, the cross-sectional C-shape may vary in one or more dimensions along the longitudinal length of the sensor pin 860, and in some embodiments may only be present at certain locations along the longitudinal length of the sensor pin 860. In such embodiments, the notch may be made deeper than illustrated in the embodiment of FIG. 8. In some embodiments, the internal space within the C-shape of the sensor pin 860 allows inward deformation of the sensor pin 860 as it is inserted within a sensor bore, resulting in an outward bias which provides a tighter fit of the sensor pin 860 against the internal surface of the sensor bore. In some embodiments, the outer dimensions of the sensor pin 860 in an unloaded state may be larger than the corresponding internal dimensions of the sensor bore in the seated position of the sensor pin 860 within the sensor bore.

Figure 9:
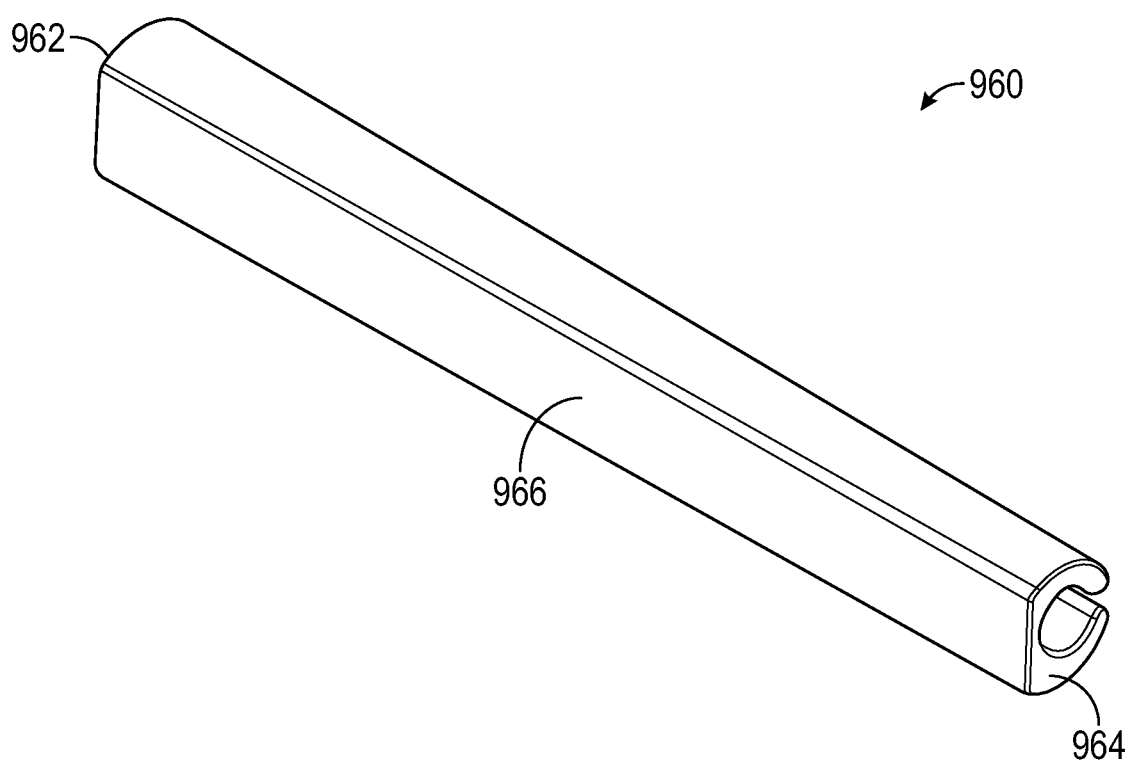
FIG. 9 is a perspective view illustrating another embodiment of a sensor pin, the sensor pin having a C-shaped cross-sectional shape with a truncated side.

FIG. 9 is a perspective view illustrating another embodiment of a sensor pin. The sensor pin 960 of FIG. 9 is similar to the sensor pin 860 of FIG. 8, except that instead of a discrete notch defining a central section 866, the sensor pin 960 has a generally planar face 966 extending the longitudinal length of the sensor pin 960, from the proximal end 962 to the distal end 964.

Figure 10:
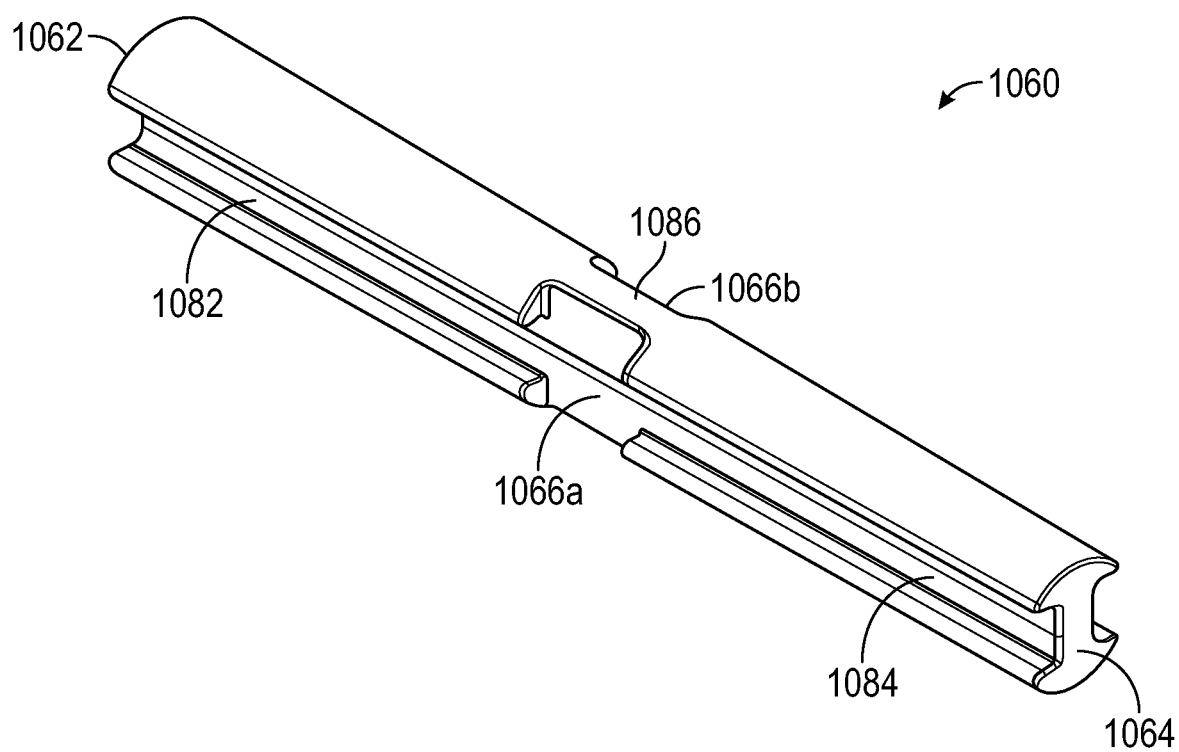
FIG. 10 is a perspective view illustrating another embodiment of a sensor pin, portions of which have an I-shaped cross-sectional shape.

FIG. 10 is a perspective view illustrating another embodiment of a sensor pin. The sensor pin 1060 of FIG. 10 includes a central section 1086, a proximal section 1082 extending between the proximal end 1062 and the central section 1086, and a distal section 1084 extending between the central section 1086 and the distal end 1064. The central section 1086 includes first and second generally planar faces 1066a and 1066b. The proximal section 1082 and the distal section 1084 have a generally I-shaped cross-sectional shape. In the illustrated embodiment, the narrow portions of the cross-sectional I-shapes are defined by longitudinally extending notches which define longitudinally extending sections coplanar with the first and second generally planar faces 1066a and 1066b, respectively.

Figure 11:
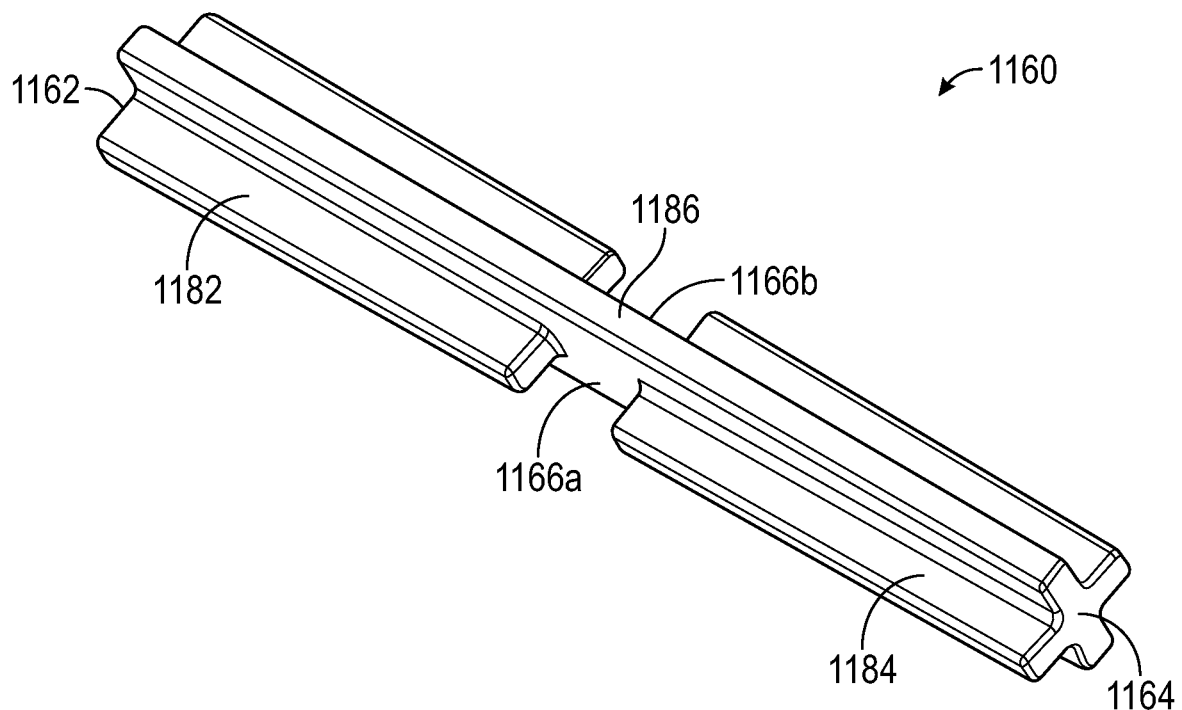
FIG. 11 is a perspective view illustrating another embodiment of a sensor pin, portions of which have a T-shaped cross-sectional shape.

FIG. 11 is a perspective view illustrating another embodiment of a sensor pin. The sensor pin 1160 of FIG. 11 includes a central section 1186, a proximal section 1182 extending between the proximal end 1162 and the central section 1186, and a distal section 1184 extending between the central section 1186 and the distal end 1164. The central section 1186 includes first and second generally planar faces 1166a and 1166b. The proximal section 1182 and the distal section 1184 have a generally X or T-shaped cross-sectional shape. In the illustrated embodiment, the narrow portions of the cross-sectional X or T-shapes are defined longitudinally extending sections coplanar with the first and second generally planar faces 1166a and 1166b, respectively. In various implementations, the sensor pin can include one or a plurality of ears. As illustrated, the ears can comprise outwardly extending flanges. Outer ends of the ears can be configured to engage (e.g., abut against) the inside of the sensor bore 240. This can facilitate installation and/or removal of the sensor pin from the bore and/or transmission of loads (e.g., compressive and/or vibration loads) to the sensor pin. In some implementations, the bore and pin can include interfacing structures that control the orientation of the pin within the bore, such as permit the pin to be inserted into the bore in only a certain rotational orientation or orientations. For example, the pin can include a protrusion and the bore can include a channel that receives the protrusion (e.g., in only one rotational orientation), or vice versa. In certain implementations, the pin and bore comprise threads that enable the pin to be threaded into the bore.

Figure 12:
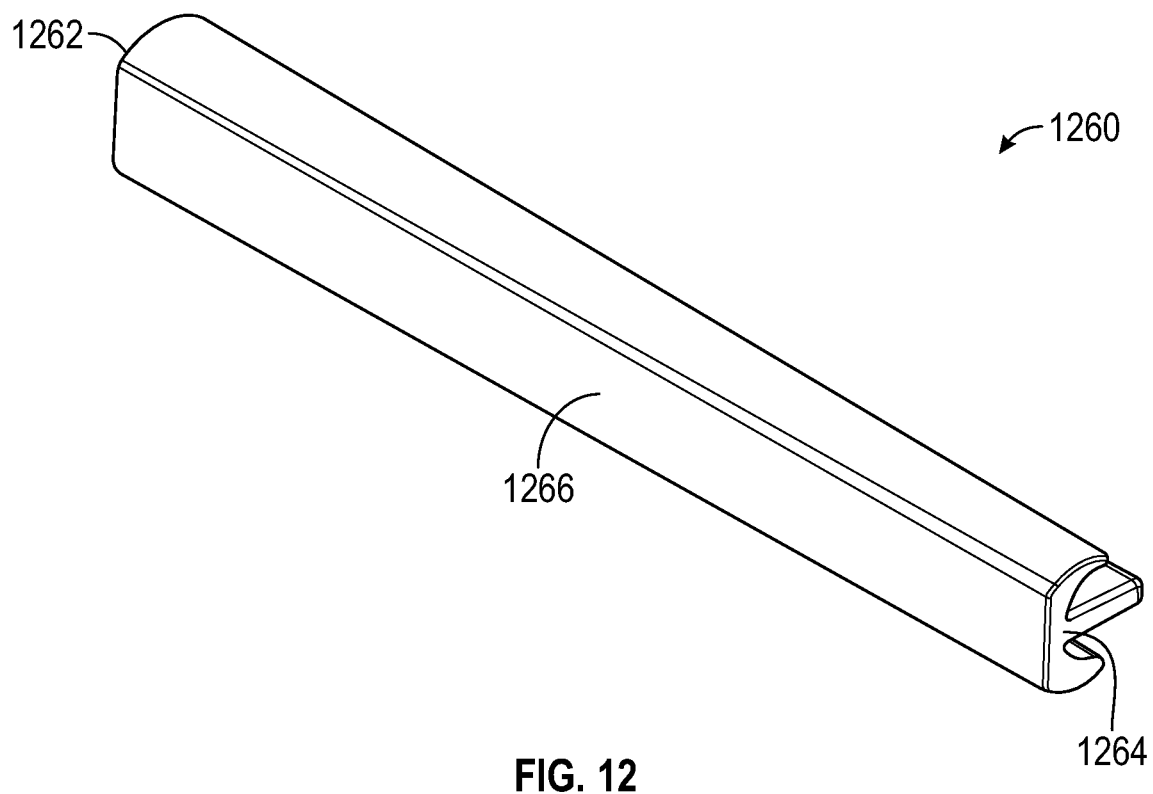
FIG. 12 is a perspective view illustrating another embodiment of a sensor pin, portions of which have a T-shaped cross-sectional shape.

FIG. 12 is a perspective view illustrating another embodiment of a sensor pin. The sensor pin 1260 has a generally planar face 1266 extending the longitudinal length of the sensor pin 1260, from the proximal end 1262 to the distal end 1264. As can be seen in FIG. 12, at least a portion of the sensor pin 1260 has a cross-sectional shape which is generally T-shaped, with a laterally extending section extending orthogonally to the generally planar face, and two curved wing sections respectively above and below the laterally extending section. Like the sensor pin 860 of FIG. 8, the internal spaces within the T-shape of the sensor pin 1260 allow inward deformation of the sensor pin 1260 as it is inserted within a sensor bore, resulting in an outward bias which provides a tighter fit of the sensor pin 1260 against the internal surface of the sensor bore.

Figure 13:
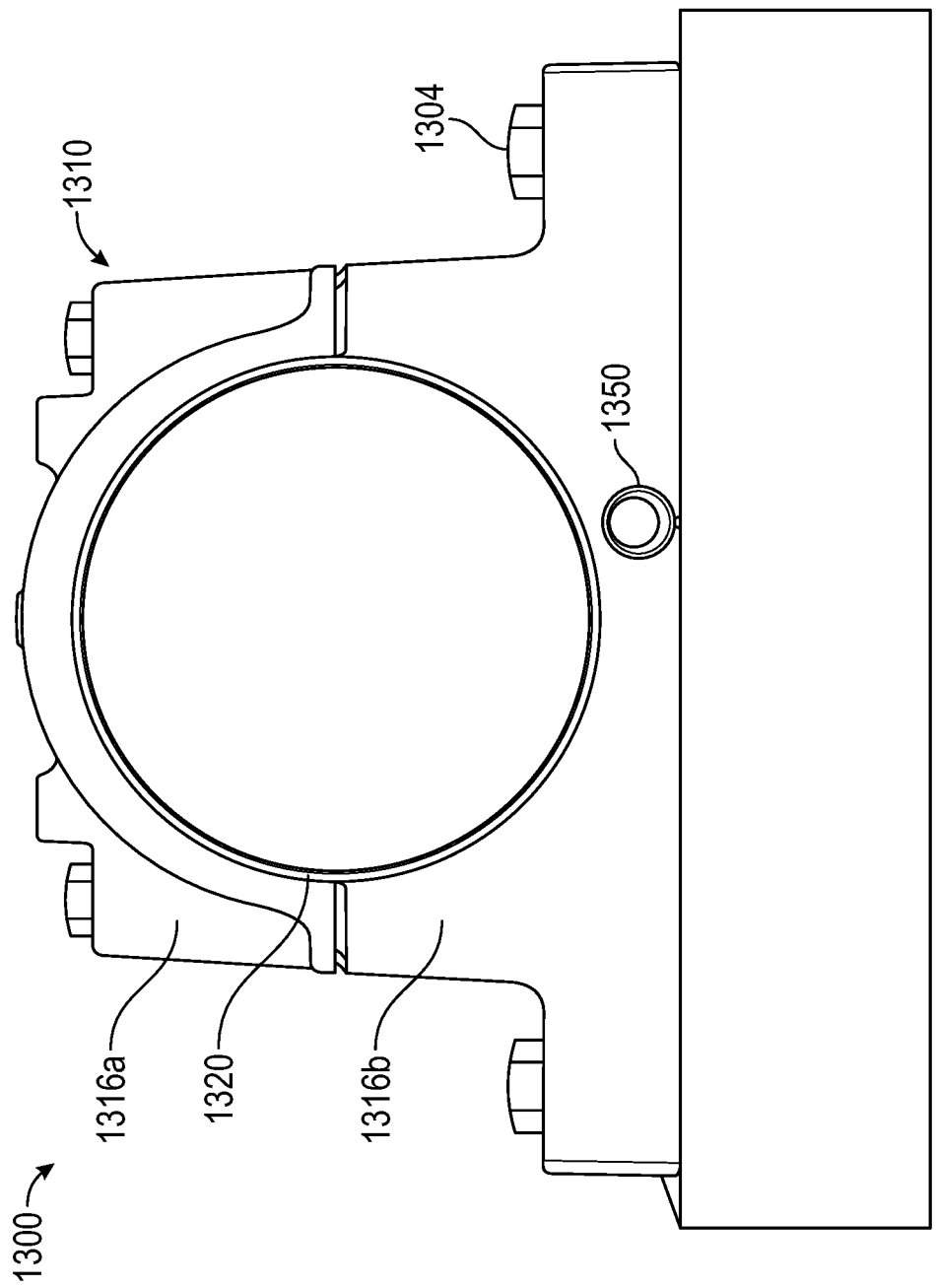
FIG. 13 is a front view schematically illustrating a bearing assembly including a laterally offset integrated sensor module.

In some embodiments, the sensor module may not be aligned with the centerline of the bearing element. FIG. 13 is a front view schematically illustrating a bearing assembly including a laterally offset integrated sensor module. The bearing assembly 1300 is similar to the bearing assembly 200 of FIG. 2, except that the sensor module 1350 is laterally offset from the rotational axis of the bearing module 1320. In other embodiments, the longitudinal axis of the sensor module 1350 may not be coplanar with the rotational axis of the bearing element 1320. In some embodiments, the sensor bore and sensor module may extend into the bearing housing in a direction which is not normal to a front face of the bearing housing. For example, in some embodiments, the sensor bore and sensor module may extend into the bearing housing in a direction parallel to a front face of the bearing housing, or at any other angle.

While certain embodiments have been described, these embodiments have been presented by way of example only and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope of the disclosure.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Certain terminology may be used in the following description for the purpose of reference only, and thus is not intended to be limiting. For example, terms such as "upper", "lower", "upward", "downward", "above", "below", "top", "bottom", "left", and similar terms refer to directions in the drawings to which reference is made. Such terminology may include the words specifically mentioned above, derivatives thereof, and words of similar import. Similarly, the terms "first", "second", and other such numerical terms referring to structures neither imply a sequence or order unless clearly indicated by the context.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "spherical" or "circular" or "cylindrical" or "semi-circular" or "semi-cylindrical" or any related or similar terms, are not required to conform strictly to the mathematical definitions of spheres, circles, cylinders or other structures, but can encompass structures that are reasonably close approximations.

The terms "approximately," "about," and "substantially" as used herein represent an amount close to the stated amount that still performs a desired function or achieves a desired result. For example, in some embodiments, as the context may permit, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may permit, the term "generally parallel" can refer to something that departs from exactly parallel by less than or equal to 20 degrees. As another example, in certain embodiments, as the context may permit, the term "generally perpendicular" can refer to something that departs from exactly perpendicular by less than or equal to 20 degrees.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

Although the invention has been disclosed in the context of certain embodiments and examples, it will be understood by those skilled in the art that this disclosure extends beyond the specifically disclosed embodiments to other alternative embodiments and/or uses of the embodiments and certain modifications and equivalents thereof. The scope of the present disclosure is not intended to be limited by the specific disclosures of preferred embodiments in this section or elsewhere in this specification, and may be defined by claims as presented in this section or elsewhere in this specification or as presented in the future.

What is claimed is:

1. A load-sensing bearing assembly, comprising:
   a bearing housing;
   a bearing element retained within the bearing housing;
   a sensor bore formed in the bearing housing, the bore located between the bearing element and a mounting face of the bearing housing;
   a sensor module disposed within the bore, the sensor module comprising:
      a sensor pin dimensioned to fit within the sensor bore; and
      a strain gauge supported by the sensor pin and oriented to provide an indication of a compressive load acting on the bearing assembly.

2. The assembly of claim 1, wherein a portion of the bearing housing extending between the sensor bore and the bearing element is a contiguous structure.

3. The assembly of claim 1, wherein the bearing assembly comprises at least one retention mechanism configured to maintain an axial compressive load on the sensor pin when the sensor pin is disposed within the sensor bore.

4. The assembly of claim 3, wherein the sensor pin has a tapered outer profile.

5. The assembly of claim 1, wherein the sensor pin comprises at least one generally planar mounting surface, and wherein the strain gauge is mounted on the generally planar mounting surface.

6. The assembly of claim 1, wherein the strain gauge comprises a plurality of elongate traces oriented in a direction generally perpendicular to a rotational axis of the bearing element.

7. The assembly of claim 1, wherein the sensor bore extends in a direction substantially parallel to a rotational axis of the bearing element.

8. The assembly of claim 1, wherein the sensor module further comprises:
   a controller configured to condition a signal from the strain gauge;
   a power source; and
   a communications module.

9. The assembly of claim 8, wherein the communications module comprises a wireless communications module.

10. The assembly of claim 1, wherein the sensor module further comprises a second strain gauge oriented to be unresponsive to a compressive load acting on the bearing assembly.

11. A sensor module configured to be integrally installed in a sensor bore in a sensor housing, the sensor module comprising:
    a sensor pin extending along a longitudinal axis;
    a mounting surface;
    a strain gauge supported by the mounting surface and comprising a plurality of elongate traces oriented in a direction generally perpendicular to the longitudinal axis of the sensor pin, the strain gauge configured to provide an output of a compressive load acting on the sensor pin in a direction generally perpendicular to the longitudinal axis of the bearing;
    a power source; and
    a communications module configured to transmit information indicative of the compressive load acting on the sensor pin.

12. The sensor module of claim 11, wherein the mounting surface comprises a generally planar mounting surface.

13. The sensor module of claim 11, wherein the sensor pin has a tapered outer profile.

14. The sensor module of claim 11, wherein the communications module comprises a wireless communications module.

15. The sensor module of claim 11, wherein the sensor module further comprises a second strain gauge oriented to be unresponsive to a compressive load acting on the sensor pin in a direction generally perpendicular to the longitudinal axis of the bearing, the second strain gauge comprising a plurality of elongated traces oriented in a direction generally perpendicular to the longitudinal axis of the sensor pin.

16. A method of integrally installing a sensor module into a bearing assembly, the bearing assembly comprising a bearing housing, a bearing element retained within the bearing housing, and a sensor bore formed in the bearing housing, the method comprising:
    inserting a sensor module into the sensor bore in the bearing housing, the sensor module comprising:
       a sensor pin dimensioned to fit within the sensor bore; and
       a strain gauge supported by the sensor pin and oriented to provide an indication of a compressive load acting on the bearing assembly; and
    securing the sensor module in place within the sensor bore.

17. The method of claim 16, wherein inserting the sensor module into the sensor bore in the bearing housing is performed while the bearing assembly is secured to a mounting surface.

18. The method of claim 16, wherein inserting the sensor module into the sensor bore in the bearing housing is performed while the bearing assembly is in operation.

19. The method of claim 16, additionally comprising forming the sensor bore in the bearing housing of an installed bearing assembly prior to inserting the sensor module into the sensor bore in the bearing housing.

20. The method of claim 16, wherein securing the sensor module in place within the sensor bore comprises securing the sensor module in place using a securement mechanism such that the sensor pin is under an axial compressive load.

21. A method of installing a bearing assembly comprising an integral sensor module, the method comprising:
- uninstalling an existing bearing assembly from a mounting surface, the existing bearing assembly comprising a bearing element configured to support a shaft at a first distance from the mounting surface;
- installing a replacement bearing assembly on the mounting surface, the replacement bearing assembly comprising:
  - a bearing housing;
  - a bearing element retained within the bearing housing and configured to support the shaft at the same first distance from the mounting surface as the existing bearing assembly; and
  - a sensor aperture extending into the bearing housing, the sensor aperture located between the bearing element and the mounting surface; and
- inserting a sensor module into the sensor aperture in the bearing housing, the sensor module comprising:
  - a sensor pin dimensioned to fit within the sensor aperture; and
  - a strain gauge supported by the sensor pin and oriented to provide an indication of a compressive load acting on the replacement bearing assembly; and
- securing the sensor module in place within the sensor aperture such that the sensor pin is under an axial compressive load.

22. The method of claim 21, wherein the sensor module is inserted into the replacement bearing assembly prior to the installation of the replacement bearing assembly on the mounting surface.

23. The method of claim 21, additionally comprising inserting the shaft into the replacement bearing assembly, wherein the sensor module is inserted into the replacement bearing assembly after the shaft has been inserted into the replacement bearing assembly.

24. The method of claim 21, wherein the shaft supports a rotating biological collector.

* * * * *